US011101850B2

(12) United States Patent
Cao

(10) Patent No.: US 11,101,850 B2
(45) Date of Patent: Aug. 24, 2021

(54) ELECTRONIC DEVICE AND COMMUNICATION METHOD

(71) Applicant: Sony Corporation, Tokyo (JP)

(72) Inventor: Jianfei Cao, Beijing (CN)

(73) Assignee: SONY CORPORATION, Tokyo (JP)

( * ) Notice: Subject to any disclaimer, the term of this patent is extended or adjusted under 35 U.S.C. 154(b) by 116 days.

(21) Appl. No.: 16/483,045

(22) PCT Filed: May 10, 2018

(86) PCT No.: PCT/CN2018/086289
§ 371 (c)(1),
(2) Date: Aug. 2, 2019

(87) PCT Pub. No.: WO2018/205972
PCT Pub. Date: Nov. 15, 2018

(65) Prior Publication Data
US 2020/0007196 A1    Jan. 2, 2020

(30) Foreign Application Priority Data

May 12, 2017    (CN) .......................... 201710340801.6

(51) Int. Cl.
*H04B 7/0408* (2017.01)
*H04B 7/0452* (2017.01)
(Continued)

(52) U.S. Cl.
CPC ......... *H04B 7/0408* (2013.01); *H04B 7/0452* (2013.01); *H04B 7/0695* (2013.01); *H04B 7/088* (2013.01)

(58) Field of Classification Search
CPC ........... H04W 72/042; H04W 72/0453; H04W 74/006; H04W 72/1289; H04W 48/12;
(Continued)

(56) References Cited

U.S. PATENT DOCUMENTS

| 2015/0124738 A1 | 5/2015 | Ramakrishna |
| 2018/0227035 A1* | 8/2018 | Cheng .................. H04B 7/0695 |
| 2020/0162289 A1* | 5/2020 | Ahn ...................... H04L 5/0094 |

FOREIGN PATENT DOCUMENTS

| CN | 103891161 A | 6/2014 |
| CN | 103891161 A | 6/2014 |

(Continued)

OTHER PUBLICATIONS

International Search Report and Written Opinion dated Jul. 25, 2018 for PCT/CN2018/086289 filed on May 10, 2018, 9 pages including English Translation of the International Search Report.

*Primary Examiner* — Rahel Guarino
(74) *Attorney, Agent, or Firm* — Xsensus LLP

(57) ABSTRACT

An electronic device used in a first communication device side is configured for determining a simplified scheme for beam sweeping to be performed on a first channel from the first communication device to a second communication device and a second channel from the second communication device to the first communication device based on beam correspondence information of transmitting and receiving beams of the first communication device.

19 Claims, 12 Drawing Sheets

(51) Int. Cl.
  *H04B 7/06* (2006.01)
  *H04B 7/08* (2006.01)
(58) Field of Classification Search
  CPC . H04W 72/0413; H04B 7/0695; H04B 7/088; H04B 7/0408; H04B 7/0452
  See application file for complete search history.

(56) References Cited

FOREIGN PATENT DOCUMENTS

| | | | |
|---|---|---|---|
| CN | 106031066 A | 10/2016 |
| CN | 106031066 A | 10/2016 |
| CN | 106256144 A | 12/2016 |
| CN | 106256144 A | 12/2016 |

\* cited by examiner

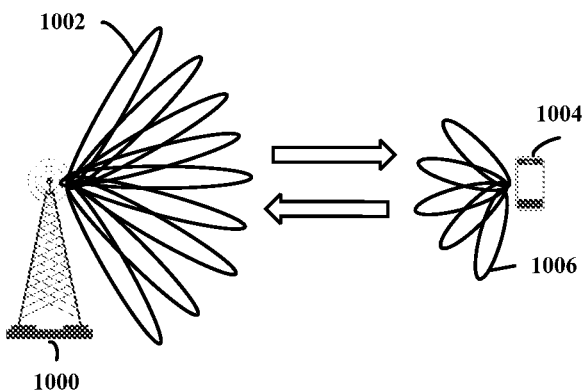
Fig. 1
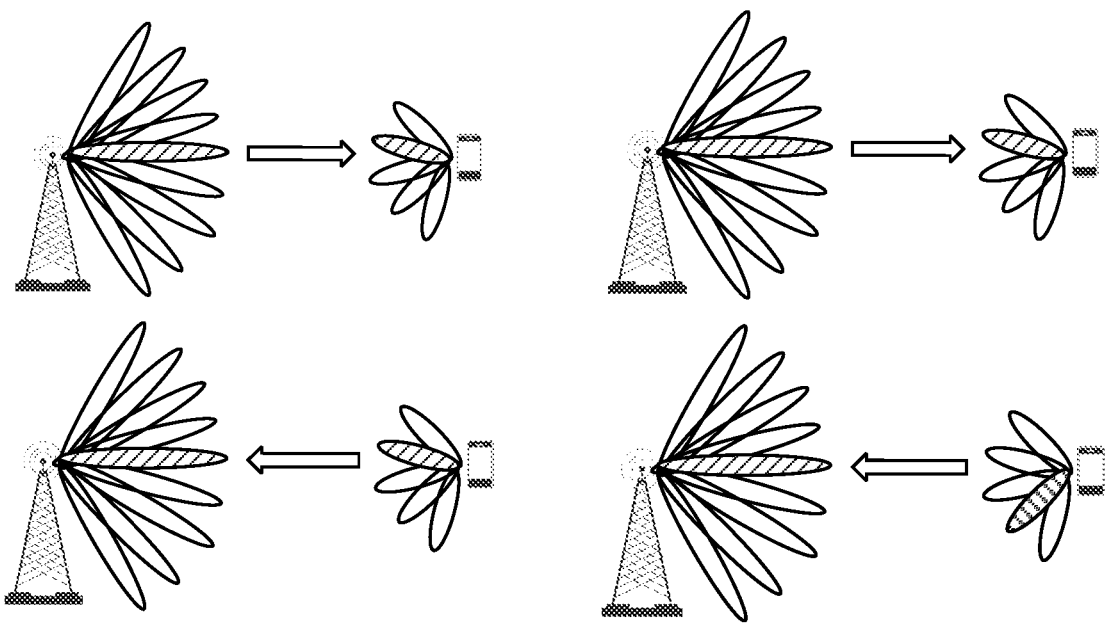
Fig. 2A
Fig. 2B

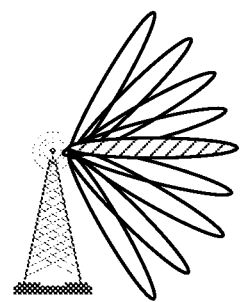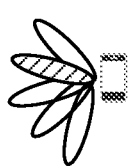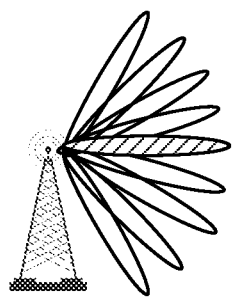
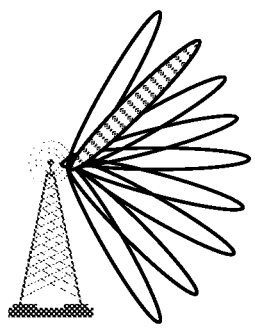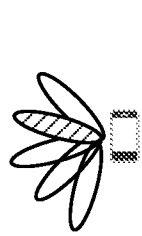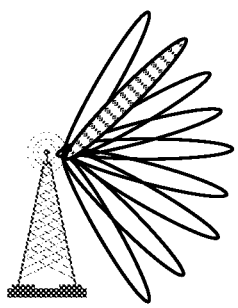
Fig. 2CFig. 2D
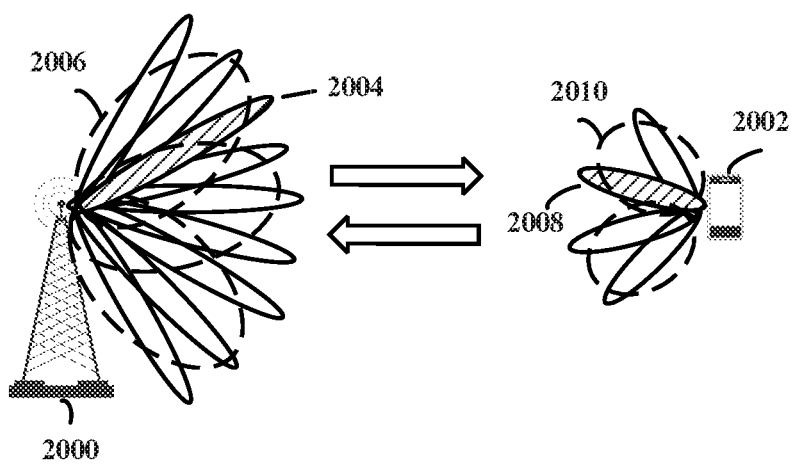
Fig. 2E

ELECTRONIC DEVICE AND COMMUNICATION METHOD

CROSS-REFERENCE TO RELATED APPLICATIONS

The present application is based on PCT filing PCT/CN2018/086289, filed May 10, 2018, which claims priority to Chinese Patent Application No. 201710340801.6, filed on May 12, 2017, the entire disclosure of each is incorporated by reference herein in its entirety as a part of the present application.

TECHNICAL FIELD

The present disclosure relates to an electronic device and a communication method, and more particularly, to an electronic device and a communication method for Beam Sweeping of a wireless communication system.

BACKGROUND

During the continuous evolution of wireless communication technologies such as 3GPP (3rd Generation Partnership Project), as the frequency band used increases (such as 26 GHz, 60 GHz or higher), path loss of the wireless channel also increases. By using the Multi-Input Multi-Output (MIMO) technology (such as Massive MIMO technology) to improve the beamforming gain, the large path loss that exists in the high-frequency channel can be compensated.

In a high frequency MIMO system, a base station (as an example of a network side communication device or a communication node in a system) and a terminal device (which may also be referred to as a User Equipment (UE), as an example of a user side communication device or a communication node in the system) have multiple antennas that support MIMO technology. The base station antenna and the UE antenna can form spatial beams with narrow directivity to provide strong power coverage in a particular direction, thereby countering the large path loss that exists in the high frequency channel. However, since these spatial beams have strong directivity and narrow coverage, it is necessary to select appropriate transmitting and receiving beams from multiple transmitting and receiving beams of the base station and the UE to perform transmission of data and/or control signals on the uplink and downlink channels.

The appropriate transmitting and receiving beams can be selected by beam sweeping. Specifically, by performing downlink beam sweeping from the base station to the UE, a downlink reference signal is transmitted on multiple transmitting beams of the base station, and the downlink reference signal is received by using multiple receiving beams of the UE, and the maximum transmitting beam of the base station and the maximum receiving beam of the UE can be selected. Similarly, by performing uplink beam sweeping from the UE to the base station, the maximum receiving beam of the base station and the maximum transmitting beam of the UE can be selected.

However, in known beam sweeping schemes, uplink beam sweeping and downlink beam sweeping need to be performed independently, and all spatial beams of the base station and the UE need to be traversed in the process of uplink and downlink beam sweeping, thereby consuming a large amount of system resources. Therefore, a simplified design for known beam sweeping schemes is needed.

SUMMARY OF THE INVENTION

A brief summary of the disclosure is presented below to provide a basic understanding of some aspects of the disclosure. However, it should be understood that this summary is not an exhaustive overview of the disclosure. It is not intended to identify a key or critical part of the disclosure, nor is it intended to limit the scope of the disclosure. Its purpose is merely to present some of the concepts of the present disclosure in a simplified form as a prelude to a more detailed description given later.

According to one aspect of the present disclosure, an electronic device used in a first communication device side is provided. The electronic device can include a processing circuit configured to determine, according to beam correspondence information of receiving and transmitting beams of the first communication device, a simplified scheme for beam sweeping which is to be executed on a first channel from the first communication device to a second communication device and a second channel from the second communication device to the first communication device.

According to another aspect of the present disclosure, a communication method is provided. The method can include determining, according to beam correspondence information of receiving and transmitting beams of the first communication device, a simplified scheme for beam sweeping which is to be executed on a first channel from the first communication device to a second communication device and a second channel from the second communication device to the first communication device.

In accordance with yet another aspect of the present disclosure, a non-transitory storage medium storing instructions causing a processor to perform the communication method in accordance with the present disclosure is provided.

According to one or more embodiments of the present disclosure, beam management, and particularly a beam sweeping scheme, can be simplified, the overhead of beam sweeping can be reduced, thereby reducing consumption of system resources.

BRIEF DESCRIPTION OF THE DRAWINGS

The drawings that form a part of the specification describe embodiments of the present disclosure, and, along with the specification, are used to explain the principles of the present disclosure.

The present disclosure can be more clearly understood from the following detailed description with reference to the accompanying drawings, in which:

FIG. 1 is a schematic diagram illustrating a beam sweeping process in a wireless communication system;

FIGS. 2A-2E are schematic diagrams illustrating receiving and transmitting beam correspondence, in accordance with an embodiment of the present disclosure;

DETAILED DESCRIPTION

Figure 3:
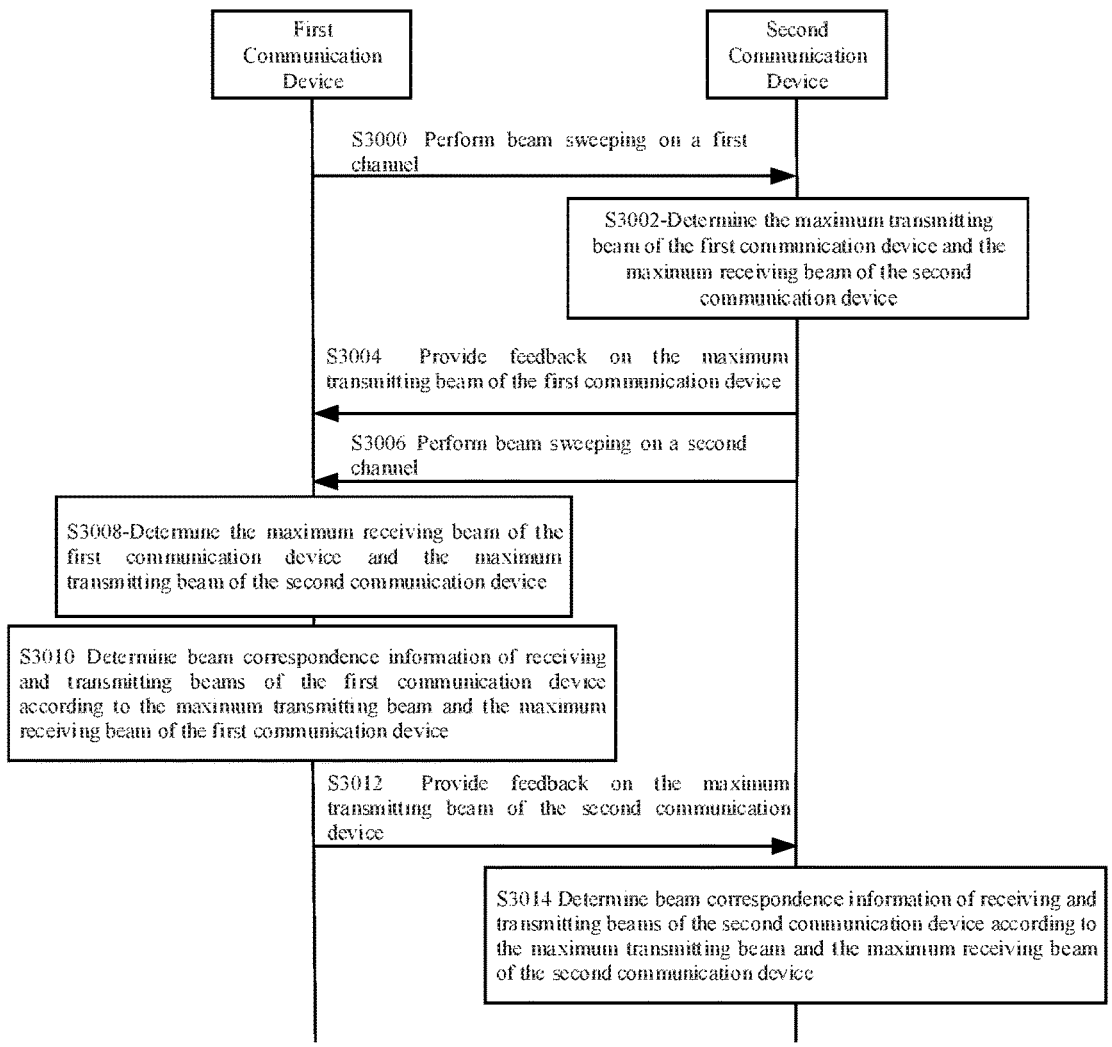
FIG. 3 is a signaling diagram illustrating acquisition of receiving and transmitting beam correspondence information, in accordance with an embodiment of the present disclosure.

Various exemplary embodiments of the present disclosure will now be described in detail with reference to the drawings. It should be noted that, unless otherwise specifically indicated, the relative arrangement of the components and steps, numerical expressions and numerical values set forth in the embodiments are not intended to limit the scope of the disclosure.

In the meantime, it should be understood that the dimensions of the various parts shown in the drawings are not drawn in accordance with the actual scaling relationship for convenience of the description.

The following description of at least one exemplary embodiment is merely illustrative and is in no way intended as any limitation to the disclosure and the application or use thereof.

Techniques, methods and devices known to those of ordinary skill in the relevant art may not be discussed in detail, but the techniques, methods and devices should be considered as part of the specification, when appropriate.

In all of the examples shown and discussed herein, any specific values are to be construed as illustrative only and not as a limitation. Accordingly, other examples of the exemplary embodiments may have different values.

It should be noted that similar reference numerals and letters indicate similar items in the following figures, and therefore, once an item is defined in one figure, it is not required to be further discussed in the subsequent figures.

To facilitate a better understanding of the technical solutions in accordance with the present disclosure, some of the concepts used in the present disclosure are briefly described below.

Base stations and UEs have multiple antennas that support MIMO technology. The use of MIMO technology enables base stations and UEs to utilize spatial domain to support spatial multiplexing, beamforming, and transmit diversity. Spatial multiplexing can be used to simultaneously transmit different data streams on the same frequency. These data streams can be transmitted to a single UE to increase the data rate (which can be classified as a SU-MIMO technology) or to multiple UEs to increase the total system capacity (which can be classified as a MU-MIMO technology). This is achieved by spatially precoding each data stream (i.e., performing application of scaling and phase adjustment of the amplitude at baseband) and then transmitting each spatially precoded stream on the downlink (DL) from the base station to the UE through multiple transmit antennas. The spatially precoded data streams arrive at the UE(s) with different spatial signatures, which enables each of the UE(s) to receive data streams via multiple antennas thereof and recover one or more data streams destined for the UE. On the uplink (UL) from the UE to the base station, each UE transmits a spatially precoded data stream through its multiple antennas, which enables the base station to receive the data stream through its antenna and identify the source of each spatially precoded data stream.

In addition to performing spatial precoding at the baseband, the phase of multiple antennas connected to each RF link can be adjusted to use beamforming to concentrate the transmitting/receiving energy of the corresponding RF links in a particular direction, so as to improve signal transmission/reception strength. The beams mentioned in the following embodiments of the present disclosure are primarily formed by this way.

Next, the radio protocol architecture for the user plane and the control plane in LTE (Long Term Evolution) and NR (New Radio) will be explained. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer. Layer 2 (L2 layer) is above the physical layer and is responsible for the link between the UE and the eNB or gNB over the physical layer.

In the user plane, the L2 layer includes a Medium Access Control (MAC) sublayer, a Radio Link Control (RLC) sublayer, and a Packet Data Convergence Protocol (PDCP) sublayer, which are terminated at the eNB or gNB on the network side. The UE may also have several upper layers above the L2 layer, including a network layer (e.g., an IP layer) that is terminated at the PDN gateway on the network side, and an application layer that is terminated at the other end of the connection (e.g., a far end UE, a server, etc.).

The PDCP sublayer provides multiplexing between different radio bearers and logical channels. The PDCP sublayer also provides header compression for upper layer data packets to reduce radio transmission overhead, provides security by ciphering data packets, and providing handover support for UEs between eNBs and gNBs. The RLC sublayer provides segmentation and reassembly of upper layer data packets, retransmission of lost data packets, and reordering of data packets to compensate for out-of-order reception due to hybrid automatic repeat request (HARQ). The MAC sublayer provides multiplexing between logical channels and transport channels. The MAC sublayer is also responsible for allocating various radio resources (e.g., resource blocks) in one cell among the UEs. The MAC sublayer is also responsible for HARQ operations.

In the control plane, the radio protocol architecture for the UE, the eNB and the gNB is substantially the same for the physical layer and the L2 layer, with the exception that there is no header compression function for the control plane. The control plane also includes a Radio Resource Control (RRC) sublayer in Layer 3 (L3 layer). The RRC sublayer is responsible for obtaining radio resources (i.e., radio bearers) and for configuring the lower layers using RRC signaling between the eNB, the gNB, and the UE.

Various signal processing functions of the L1 layer (i.e., physical layer) implemented on the base station side will be briefly introduced below. These signal processing functions include coding and interleaving to facilitate forward error correction (FEC) at the UE and mapping to the signal constellation based on various modulation schemes (e.g., binary phase-shift keying (BPSK), quadrature phase-shift keying (QPSK), M-phase-shifting Keying (M-PSK), M-Quadrature Amplitude Modulation (M-QAM)). The coded and modulated symbols are then split into parallel streams. Each stream is then used with a reference signal to generate a physical channel carrying a time domain symbol stream. The symbol stream is spatially precoded to produce multiple spatial streams. Channel estimation can be used to determine the coding and modulation schemes as well as for spatial processing. The channel estimation can be derived from a reference signal and/or channel condition feedback transmitted by the UE. Each spatial stream is then provided to a different antenna via a separate transmitter. Each transmitter modulates a RF carrier with respective spatial stream for transmission.

At the UE, each receiver receives signals through its respective antenna. Each receiver recovers information modulated onto the radio frequency (RF) carrier and provides the information to various signal processing functions of the L1 layer. Spatial processing is performed on the information at the L1 layer to recover any spatial streams destined for the UE. If there are multiple spatial streams destined for the UE, they can be combined into a single symbol stream. The symbol stream is then converted from the time domain to the frequency domain. Each symbol, and the reference signal, are recovered and demodulated by determining the signal constellation points that are most likely to have been transmitted by the eNB or gNB. These soft decisions can be based on channel estimation. These soft decisions are then decoded and deinterleaved to recover the data and control signals that were originally transmitted by the eNB or gNB on the physical channel. These data and control signals are then provided to higher layer for processing.

The beam sweeping process in a wireless communication system will be briefly described below with reference to FIG. 1. The arrow to the right in FIG. 1 indicates a downlink direction from a base station 1000 to a terminal device 1004, and the arrow to the left indicates an uplink direction from the terminal device 1004 to the base station 1000. As illustrated in FIG. 1, the base station 1000 includes $n_{t\_DL}$ downlink transmitting beams ($n_{t\_DL}$ is a natural number greater than or equal to 1, exemplified as $n_{t\_DL}=9$ in FIG. 1), and the terminal device 1004 includes $n_{r\_DL}$ downlink receiving beams ($n_{r\_DL}$ is a natural number greater than or equal to 1, exemplified as $n_{r\_DL}=5$ in FIG. 1). In addition, in the wireless communication system shown in FIG. 1, the number of uplink receiving beams of the base station 1000, $n_{r\_UL}$, and the coverage of each beam are the same as the downlink transmitting beams, and the number of uplink transmitting beams of the terminal device 1004, $n_{t\_UL}$, and the coverage of each beam are the same as the downlink receiving beams. It should be understood that the coverage and numbers of uplink receiving beams and downlink transmitting beams of the base station may be different depending on system requirements and settings, as are the terminal devices.

As illustrated in FIG. 1, in the process of downlink beam sweeping, each of the $n_{t\_DL}$ downlink transmitting beams 1002 of the base station 1000 transmits $n_{r\_DL}$ downlink reference signals to the terminal device 1004, and the terminal device 1004 receives the $n_{r\_DL}$ downlink reference signals through the $n_{r\_DL}$ downlink receiving beams, respectively. In this manner, the $n_{t\_DL}$ downlink transmitting beams of the base station 1000 sequentially transmit $n_{t\_DL} \times n_{r\_DL}$ downlink reference signals to the terminal device 1004, and each downlink receiving beam 1006 of the terminal device 1004 receives $n_{t\_DL}$ downlink reference signals, that is, $n_{r\_DL}$ downlink receiving beams of the terminal device 1004 collectively receive $n_{t\_DL} \times n_{r\_DL}$ downlink reference signals from the base station 1000. The terminal device 1004 measures the $n_{t\_DL} \times n_{r\_DL}$ downlink reference signals (e.g., measures received signal power (e.g., reference signal received power RSRP), or channel quality (e.g., channel quality indicator, CQI) of the downlink reference signals), thereby determining the maximum downlink transmitting beam of the base station 1000 and the maximum downlink receiving beam of the terminal device 1004.

In the process of uplink beam sweeping, similarly to the downlink beam sweeping, each of the $n_{t\_UL}$ uplink transmitting beams 1006 of the terminal device 1004 transmits $n_{r\_UL}$ uplink reference signals to the base station 1000, and the base station 1000 receives the $n_{r\_UL}$ uplink reference signals through the $n_{r\_UL}$ uplink receiving beams, respectively. In this manner, the $n_{t\_UL}$ uplink transmitting beams of the terminal device 1004 sequentially transmit $n_{t\_UL} \times n_{r\_UL}$ uplink reference signals to the base station 1000, and each uplink receiving beam 1002 of the base station 1000 receives $n_{t\_UL}$ uplink reference signals, that is, $n_{r\_UL}$ uplink receiving beams of the base station 1000 collectively receive $n_{r\_UL} \times n_{t\_UL}$ uplink reference signals from the terminal device 1004. The base station 1000 measures the $n_{r\_UL} \times n_{t\_UL}$ uplink reference signals (e.g., measures received signal power (e.g., RSRP), or channel quality (e.g., CQI) of the uplink reference signals), thereby determining the maximum uplink transmitting beam of the terminal device 1004 and the maximum uplink receiving beam of the base station 1000.

It should be understood that the coverage and numbers of uplink receiving beams and downlink transmitting beams of the base station may be different and the coverage and numbers of uplink transmitting beams and downlink receiving beams of the terminal devices may be different, and the above determining operations may be performed similarly.

After the processes of downlink beam sweeping and uplink beam sweeping are completed, the following transmission of data and/or control signals is performed using the determined maximum receiving and transmitting beams of the base station and the maximum receiving and transmitting beams of the terminal device. The above process of determining the maximum receiving and transmitting beams of a base station and a terminal device by beam sweeping is sometimes referred to as a beam training process.

The receiving beams and the transmitting beams of the base station and the terminal device can be generated by a DFT (Discrete Fourier Transform) vector. The following describes the downlink transmitting beam on the base station side as an example. The uplink receiving beam on the base station side and the receiving and transmitting beams on the terminal device side can also be generated in a similar manner.

For example, assuming that the base station side is equipped with $n_t$ transmit antennas, the equivalent channel from the base station to the terminal device can be represented as one vector H of $n_t \times 1$. The DFT vector u can be expressed as:

$$u = \begin{bmatrix} 1 & e^{j\frac{2\pi}{C}} & \dots & e^{j\frac{2\pi(n_t-1)}{C}} \end{bmatrix}^T, \qquad \text{[Equation 1]}$$

wherein the length of the DFT vector a is $n_t$, C represents a parameter for adjusting the width and shaping gain of the beam, and "T" represents a transpose operator.

Multiplying the equivalent channel H from the base station to the terminal device by the DFT vector a may result in one transmitting beam of the base station (such as one of the downlink transmitting beams shown in FIG. 1).

In one embodiment, the parameter C for adjusting the width and shaping gain of the beam in Equation 1 can be represented by the product of two parameters $O_2$, $N_2$. By adjusting the two parameters $O_2$, $N_2$ respectively, the width and shaping gain of the beam can be adjusted. In general, the larger the number of antennas $n_t$, or the larger the parameter C (for example, the product of $O_2$ and $N_2$), the stronger the spatial directivity of the resulting beam, but generally the narrower the beam width is. In one embodiment, $O_2=1$ and $N_2=1$ may be taken, and the DFT vector a obtained accordingly is a vector in which all $n_t$ elements are 1.

In the existing process of beam sweeping as described in accordance with FIG. 1, the uplink beam sweeping and the downlink beam sweeping are performed independently, and it is necessary to traverse all uplink receiving and transmitting beams and downlink receiving and transmitting beams of the base station and the terminal device to select the most suitable receiving and transmitting beams. Such a beam sweeping process requires a large amount of system resources.

In a wireless communication system, channel reciprocity exists as following: when the uplink and downlink channels are within the relevant time and bandwidth, the same Channel Impulse Response (CIR) can be observed on the uplink and downlink channels, and at this time, it can be considered that the uplink and downlink channels are consistent, that is, channel reciprocity exists. The inventors of the present disclosure recognize that when channel reciprocity exists, there may be a certain correspondence between the radio frequency beams of the base station and the terminal device, that is, beam correspondence (sometimes referred to as beam reciprocity or beam consistency). For example, beam correspondence may include beam correspondence of each of the base station and the terminal device, such as receiving and transmitting beam correspondence as described below, and may also include beam correspondence between the base station and the terminal device, such as the beam pairs correspondence as described below. The inventors of the present disclosure have found that the beam sweeping process can be simplified by using beam correspondence to determine a simplified scheme for beam sweeping, thereby reducing the number of beams that need to be used in the beam sweeping process and reducing consumption of system resources.

FIGS. 2A-2E illustrate schematic diagrams of receiving and transmitting beam correspondence, in accordance with an embodiment of the present disclosure. According to an embodiment of the present disclosure, receiving and transmitting beam correspondence represents a correspondence between the maximum receiving beam and the maximum transmitting beam of a communication device on one side of a communication link (e.g., a base station or a terminal device).

In FIGS. 2A-2D, in the downlink from the base station to the terminal device (as indicated by the arrow to the right in FIGS. 2A-2D), the maximum downlink transmitting beam of the base station and the maximum downlink receiving beam of the terminal device are indicated with a shadow; in the uplink from the terminal device to the base station (as indicated by the arrow to the left in FIGS. 2A-2D), the maximum uplink transmitting beam of the terminal device and the maximum uplink receiving beam of the base station are indicated with a shadow.

As illustrated in FIG. 2A, the maximum downlink transmitting beam and the maximum uplink receiving beam of the base station are the same, that is, the base station has receiving and transmitting beam correspondence. In addition, the maximum downlink receiving beam and the maximum uplink transmitting beam of the terminal device are the same, that is, the terminal device also has receiving and transmitting beam correspondence. In such cases, receiving and transmitting beam correspondence may also be referred to as full receiving and transmitting beam correspondence.

In FIG. 2B, as in FIG. 2A, the base station has receiving and transmitting beam correspondence. However, the maximum downlink receiving beam and the maximum uplink transmitting beam of the terminal device are different, that is, the terminal device does not have receiving and transmitting beam correspondence.

Similarly, in FIG. 2C, the base station does not have receiving and transmitting beam correspondence, while the terminal device has receiving and transmitting beam correspondence. In FIG. 2D, neither the base station nor the terminal device has receiving and transmitting beam correspondence.

The four cases of beam correspondence of the base station and the terminal device are described above with reference to FIGS. 2A-2D, wherein the transmitting beam of the base station has the same coverage as the receiving beam of the base station, and the coverage of the receiving beam and the transmitting beam of the terminal device is also the same. In one implementation, a 1-bit Beam Correspondence Indicator (BCI) is used to represent the above four cases of beam correspondence. For example, on the base station side, BCI=0 indicates that the base station has receiving and transmitting beam correspondence, and BCI=1 indicates that the base station does not have receiving and transmitting beam correspondence. On the terminal device side, similarly, BCI=0 indicates that the terminal device has beam correspondence, and BCI=1 indicates that the terminal device does not have beam correspondence.

However, the coverage of the transmitting beam and the receiving beam of the base station may be different, depending on different beamforming capabilities of the communication devices of both parties or different receiving and transmitting schemes, while the coverage of the transmitting beam and the receiving beam of the terminal device may also be different. In the present disclosure, beam correspondence in the case where the coverage of receiving and transmitting beams are different is further analyzed.

In accordance with an embodiment of the present disclosure, in the case that the coverage of the maximum transmitting beam and the maximum receiving beam of the communication device (e.g., base station or terminal device) partially overlaps, the communication device has partial receiving and transmitting beam correspondence. Next, partial receiving and transmitting beam correspondence will be specifically described with reference to FIG. 2E.

As illustrated in FIG. 2E, the base station 2000 has nine transmitting beams with narrower coverage (indicated by solid line beams) and three receiving beams with wider coverage (indicated by dashed line beams), wherein the maximum downlink transmitting beam 2004 of the base station 2000 (indicated by hatching) is included within the coverage of the maximum uplink receiving beam 2006. That is, the coverage of the maximum transmitting beam and the maximum receiving beam of the base station 2000 partially overlaps, and the base station 2000 has partial receiving and transmitting beam correspondence.

In addition, the terminal device 2002 has four transmitting beams with narrower coverage (indicated by solid lines) and two receiving beams with wider coverage (indicated by dashed lines), wherein the maximum uplink transmitting beam 2008 of the terminal device 2002 (indicated by hatching) is included within the coverage of the maximum downlink receiving beam 2010. That is, the coverage of the maximum transmitting beam and the maximum receiving beam of the terminal device 2002 partially overlaps, and the terminal device 2002 has partial receiving and transmitting beam correspondence.

It should be understood that FIG. 2E illustrates that there is partial receiving and transmitting beam correspondence in the case that the coverage of the transmitting beam is included in the coverage of the receiving beam, but the partial transmitting and receiving correspondence is not limited to the case illustrated in FIG. 2E. In other cases where the coverage of the receiving beam partially overlaps the coverage of the transmitting beam, there is also partial receiving and transmitting beam correspondence, for example, in the cases that the coverage of the receiving beam is included in the coverage of the transmitting beam, or the coverage of the receiving beam and the coverage of the transmitting beam overlaps, and the like.

According to one embodiment of the present disclosure, the status of beam correspondence of the communication device may be indicated by beam correspondence information of receiving and transmitting beams of a communication device (e.g., a base station or a terminal device). In one embodiment, the beam correspondence information of receiving and transmitting beams of the communication device may indicate a correspondence between the maximum transmitting beam and the maximum receiving beam of the communication device.

In one embodiment, the beam correspondence information of receiving and transmitting beams can be communicated between the communication devices. In one preferred implementation, beam correspondence information of receiving and transmitting beams can be carried by physical layer signaling. For example, beam correspondence information of receiving and transmitting beams of the base station may be included in physical layer control information (such as downlink control information (DCI)) carried on a physical downlink control channel (PDCCH) or a physical downlink shared channel (PDSCH); beam correspondence information of receiving and transmitting beams of the terminal device may be included in physical layer control information (such as uplink control information (UCI)) carried on a physical uplink control channel (PUCCH) or a physical uplink shared channel (PUSCH), for example, as part of a beam measurement report, thus achieving rapid beam correspondence notification. Alternatively, in another implementation, beam correspondence information of receiving and transmitting beams may be carried by higher layer signaling, for example, beam correspondence information of receiving and transmitting beams of the base station may be included in the high layer dedicated signaling carried on the PDSCH (such as RRC signaling of the RRC sublayer, etc.); beam correspondence information of receiving and transmitting beams of the terminal device may be included in the high layer dedicated signaling carried on the PUSCH (such as RRC signaling of the RRC sublayer, etc.); alternatively, beam correspondence information of receiving and transmitting beams of the base station or the terminal device may be configured in the Medium Access Control (MAC) control element of the MAC sublayer, thereby ensuring certain timeliness of beam correspondence notifications while saving physical layer signaling overhead. It can be understood that the beam correspondence information of receiving and transmitting beams is not necessarily bidirectionally communicated between the base station and the terminal device. In some implementations, since the beam management is mainly performed by the base station, it may be set that only the terminal device reports the receiving and transmitting beam correspondence of the terminal device to the base station unidirectionally, and the base station can obtain the global information for simplifying the beam sweeping by combining the receiving and transmitting beam correspondence of the base station. In such an example, only the corresponding uplink signaling needs to be designed to carry the beam correspondence information of receiving and transmitting beams of the terminal device.

In one embodiment, the beam correspondence information of receiving and transmitting beams may include a beam correspondence indication (BCI). However, considering the case of partial beam correspondence, a 1-bit BCI will not be able to represent all cases of beam correspondence.

In one embodiment, the BCI may be extended to 2 bits to represent all of the case of receiving and transmitting beam correspondence of the base station and the terminal device shown in FIGS. 2A-2E. For example, as shown in Table 1 below, the bit string "00" indicates that there is receiving and transmitting beam correspondence (corresponding to the cases of the base station side in FIGS. 2A and 2B and the terminal device side in FIGS. 2A and 2C), the bit string "01" indicates there is partial receiving and transmitting beam correspondence (corresponding to the cases shown on the base station side and the terminal device side in FIG. 2E), and the bit string "11" indicates that there is no receiving and transmitting beam correspondence (corresponding to the cases shown on the base station side in FIGS. 2C and 2D and the terminal device side in FIGS. 2B and 2D).

TABLE 1

|  | FIG. 2A | FIG. 2B | FIG. 2C | FIG. 2D | FIG. 2E |
| --- | --- | --- | --- | --- | --- |
| Base Station | 00 | 00 | 11 | 11 | 01 |
| Terminal Device | 00 | 11 | 00 | 11 | 01 |

Receiving and transmitting beam correspondence of a communication device (e.g., base station or terminal device) on one side of a communication link is discussed above with respect to FIGS. 2A-2E and Table 1. According to one embodiment of the present disclosure, the beam pair correspondence of the communication devices (for example, the base station and the terminal device) on both sides of the communication link may also be considered simultaneously, that is, the correspondence of the uplink and downlink beam pairs composed of the corresponding uplink and downlink beams. Next, the correspondence of the uplink and downlink beam pairs will be described by taking FIGS. 2A-2E as an example.

In FIG. 2A, the maximum downlink transmitting-receiving beam pair (i.e., the maximum downlink transmitting beam of the base station and the maximum downlink receiving beam of the corresponding terminal device) and the maximum uplink receiving-transmitting beam pair (i.e., the maximum uplink receiving beam of the base station and the maximum downlink transmitting beam of the corresponding terminal device) are exactly the same, that is, the correspondence of the uplink and downlink beam pairs exists, which can also be called full correspondence of the uplink and downlink beam pairs.

In FIGS. 2B to 2D, the maximum downlink transmitting-receiving beam pair and the maximum uplink receiving-transmitting beam pair are not identical, that is, at least one of the following two situations exists: the maximum downlink transmitting beam of the base station in the maximum downlink transmitting-receiving beam pair is completely different from the maximum uplink receiving beam of the base station in the maximum uplink receiving-transmitting beam pair and the maximum downlink receiving beam of the terminal device in the maximum downlink transmitting-receiving beam pair is completely different from the maximum uplink transmitting beam of the terminal device in the maximum uplink receiving-transmitting beam pair. At this situation, there is no correspondence of the uplink and downlink beam pair.

In addition, in FIG. 2E, the maximum downlink transmitting-receiving beam pair and the maximum uplink receiving-transmitting beam pair partially overlap, that is, the coverage of the maximum downlink transmitting beam of the base station in the maximum downlink transmitting-receiving beam pair and the maximum uplink receiving beam of the base station in the maximum uplink receiving-transmitting beam pair partially overlap and the coverage of the maximum downlink receiving beam of the terminal device in the maximum downlink transmitting-receiving beam pair and the maximum uplink transmitting beam of the terminal device in the maximum uplink receiving-transmitting beam pair partially overlap. At this situation, there is partial correspondence of the uplink and downlink beam pair.

In one embodiment, the correspondence information of the uplink and downlink beam pairs may be used to represent the correspondence of the uplink and downlink beam pairs. In one embodiment, the correspondence information of the uplink and downlink beam pairs can be configured similarly to the beam correspondence information of receiving and transmitting beams described above. For example, the correspondence information of the uplink and downlink beam pairs of the base station and the terminal device shown in FIGS. 2A-2E can be represented by 2-bit information in the signaling resource. For example, as shown in Table 2 below, the bit string "00" indicates there is correspondence of the uplink and downlink beam pairs (corresponding to the case shown in FIG. 2A), the bit string "01" indicates there is partial correspondence of the uplink and downlink beam pairs (corresponding to the case shown in FIG. 2E), and the bit string "11" indicates there is no correspondence of the uplink and downlink beam pairs (corresponding to the case shown in FIGS. 2B to 2D).

TABLE 2

| FIG. 2A | FIG. 2B | FIG. 2C | FIG. 2D | FIG. 2E |
|---------|---------|---------|---------|---------|
| 00      | 11      | 11      | 11      | 01      |

In the present disclosure, the beam correspondence information of receiving and transmitting beams and the correspondence information of the uplink and downlink beam pairs can be converted to each other. For example, when the base station and the terminal device each has receiving and transmitting beam correspondence, it may be equivalent to that the base station and the terminal device have the correspondence of the uplink and downlink beam pairs. In addition, other methods may be employed to indicate the correspondence between the receiving and transmitting beams of the base station and the terminal device, as long as such correspondence can be indicated by appropriate information in the uplink and downlink communications.

In one embodiment, the correspondence information of the uplink and downlink beam pairs can be communicated between the two communication devices. In one implementation, the correspondence information of the uplink and downlink beam pairs may be used in combination with beam correspondence information of receiving and transmitting beams of the terminal device. For example, the terminal device first transmits beam correspondence information of receiving and transmitting beams to the base station in the manner in the above embodiment, and the base station combines such information with beam correspondence information of receiving and transmitting beams of the base station and provides feedback on the correspondence information of the uplink and downlink beam pairs to the terminal device. In one preferred implementation, the correspondence information of the uplink and downlink beam pairs may be carried by physical layer signaling. For example, the correspondence information of the uplink and downlink beam pairs may be included in physical layer control information (for example, DCI) carried on the PDCCH or the PDSCH; the correspondence information of the uplink and downlink beam pairs may be included in physical layer control information (e.g., UCI) carried on the PUCCH or the PUSCH, for example, as part of a beam measurement report, thus achieving rapid beam correspondence notification. Alternatively, in another implementation, the correspondence information of the uplink and downlink beam pairs may be carried by higher layer signaling, for example, the correspondence information of the uplink and downlink beam pairs may be included in the high layer dedicated signaling carried on the PDSCH (such as RRC signaling of the RRC sublayer, etc.); the correspondence information of the uplink and downlink beam pairs may be included in the high layer dedicated signaling carried on the PUSCH (such as RRC signaling of the RRC sublayer, etc.); alternatively, the correspondence information of the uplink and downlink beam pairs is configured in the MAC control element of the MAC sublayer, thereby ensuring certain timeliness of beam correspondence notification while saving physical layer signaling overhead.

In some other embodiments, the correspondence information of the uplink and downlink beam pairs between the two communication devices is transmitted to the third communication device. For example, it is provided to neighboring base stations through communication interfaces between base stations (for example, Xn interfaces between gNodeBs/eNodeBs in the 3GPP next-generation access technology) for suppressing interference, or assisting terminal devices to quickly switch to a neighboring base station. For another example, in the case that the two communication devices are implemented as a Transmit-Receive Point (TRP) and a terminal device that are not equipped with advanced processing capabilities, the correspondence information of the uplink and downlink beam pairs can be generated by the TRP according to beam correspondence information of receiving and transmitting beams of the terminal device and beam correspondence information of receiving and transmitting beams of the TRP, and provided to the advanced network node that controls the TRP for beam management.

Hereinafter, an embodiment in which the beam sweeping scheme is simplified according to the beam correspondence information of receiving and transmitting beams will be described. However, it should be understood that the present disclosure is not limited thereto, and those skilled in the art in view of the teachings of the present disclosure, can simplify the beam sweeping scheme according to correspondence information of uplink and downlink beam pairs or other information indicating beam correspondence.

According to one embodiment of the present disclosure, beam correspondence information of receiving and transmitting beams may be acquired by performing beam sweeping. Next, a signaling diagram for acquiring beam correspondence information of receiving and transmitting beams according to an embodiment of the present disclosure will be described with reference to FIG. 3.

Hereinafter, a first channel represents a channel from a first communication device to a second communication device, and a second channel represents a channel from the second communication device to the first communication device. In one embodiment, the first communication device is a base station and the second communication device is a terminal device, the first channel is a downlink channel and the second channel is an uplink channel. In another embodiment, the first communication device is a terminal device, the second communication device is a base station, the first channel is an uplink channel, and the second channel is a downlink channel.

According to one embodiment of the present disclosure, the beam correspondence information of receiving and transmitting beams of the first communication device may be acquired by performing beam sweeping in advance on the first channel and the second channel.

In one embodiment, as shown in FIG. 3, in step S3000, beam sweeping on the first channel is performed using multiple transmitting beams of the first communication device and multiple receiving beams of the second communication device. In one embodiment, beam sweeping on the first channel may be performed by transmitting a first reference signal on the first channel from the first communication device to the second communication device. In one embodiment, the first reference signal may be a reference signal specially designed according to the requirements of beam correspondence detection, and the specific design scheme is not an issue to be solved by the present disclosure, and thus is not described herein. In another embodiment, the first reference signal may be implemented based at least on a downlink CSI-RS (Channel State Information Reference Signal) or an uplink SRS (Sounding Reference Signal) in the LTE communication system.

In step S3002, the second communication device determines the maximum transmitting beam of the first communication device and the maximum receiving beam of the second communication device. In one embodiment, the second communication device can determine the maximum transmitting beam of the first communication device and the maximum receiving beam of the second communication device by measuring the first reference signal (e.g., measuring received signal power (e.g., RSRP), channel quality (e.g., CQI) of the first reference signal).

In the case where the first communication device is a base station and the second communication device is a terminal device, steps S3000 and S3002 described above may correspond to the downlink beam sweeping process described with reference to FIG. 1.

In step S3004, the second communication device provides feedback on the maximum transmitting beam of the first communication device to the first communication device. In the example where the first communication device is implemented as a base station, the second communication device is implemented as a terminal device, and the first reference signal employs a CSI-RS, the base station will allocate different time-frequency resources for transmitting CSI-RS on different downlink beams, and the base station notifies the terminal device of the allocation of the time-frequency resources in advance. The terminal device determines the transmitting beam of the base station with the maximum received power by performing the reception and measurement of the CSI-RS on the corresponding time-frequency resources. The terminal device provides feedback on, as the maximum transmitting beam ID, the CSI-RS Resource Indicator (CRI) where the maximum CSI-RS is located, to the base station in S3004. Optionally, the second communication device also includes in the feedback the reception quality of the maximum transmitting beam, such as quantized received power, signal to interference and noise ratio, and the like.

In step S3006, the second communication device performs beam sweeping on the second channel using its multiple transmitting beams and the first communication device performs beam sweeping on the second channel using its multiple receiving beams. In one embodiment, beam sweeping on the second channel can be performed by transmitting a second reference signal on the second channel from the second communication device to the first communication device. In one embodiment, the second reference signal may be a reference signal that is specifically designed according to the requirements of beam correspondence detection. In another embodiment, the second reference signal can be implemented using an existing reference signal (e.g., CSI-RS/SRS).

In step S3008, the first communication device determines the maximum receiving beam of the first communication device and the maximum transmitting beam of the second communication device. In one embodiment, the first communication device can determine the maximum receiving beam of the first communication device and the maximum transmitting beam of the second communication device by measuring the second reference signal (e.g., measuring received signal power (e.g., RSRP), channel quality (e.g., CQI) of the second reference signal).

In the case where the first communication device is a base station and the second communication device is a terminal device, steps S3006 and S3008 described above may correspond to the uplink beam sweeping process described with reference to FIG. 1.

In step S3010, on the first communication device side, beam correspondence information of receiving and transmitting beams of the first communication device is determined according to the maximum transmitting beam and the maximum receiving beam of the first communication device. In one embodiment, beam correspondence information of receiving and transmitting beams is determined by comparing whether the maximum transmitting beam and the maximum receiving beam are the same. In one embodiment, beam correspondence information of receiving and transmitting beams is determined by comparing whether the coverage of the maximum transmitting beam and the maximum receiving beam partially overlap. In one embodiment, the determined information of transmitting and receiving correspondence of the first communication device may indicate that the receiving and transmitting beams of the first communication device are corresponding (i.e., fully corresponding), the receiving and transmitting beams are partially corresponding, or the receiving and transmitting beams are not corresponding, which, for example, can be represented by a bit string shown in Table 1.

In step S3012, the first communication device provides feedback on the maximum transmitting beam of the second communication device to the second communication device.

In step S3014, on the second communication device side, beam correspondence information of receiving and transmitting beams of the second communication device is determined according to the maximum transmitting beam and the maximum receiving beam of the second communication device. In one embodiment, beam correspondence information of receiving and transmitting beams is determined by comparing whether the maximum transmitting beam and the maximum receiving beam are the same. In one embodiment, beam correspondence information of receiving and transmitting beams is determined by comparing whether the coverage of the maximum transmitting beam and the maximum receiving beam partially overlaps. In one embodiment, the determined information of transmitting and receiving correspondence of the second communication device may indicate that the receiving and transmitting beams of the second communication device are corresponding (i.e., fully corresponding), the receiving and transmitting beams are partially corresponding, or the receiving and transmitting beams are not corresponding, which, for example, can be represented by a bit string shown in Table 1.

It should be understood that the above steps S3000~S3014 are only one example of acquiring the beam correspondence information of receiving and transmitting beams of the first communication device and the second communication device, and are not limiting. Those skilled in the art in view of the teachings of the present disclosure, can employ other specific manners to acquire beam correspondence information of receiving and transmitting beams of communication devices.

It should be understood that the above description primarily describes that the determination of receiving and transmitting beam correspondence of the first and second communication devices is performed by the first and second communication devices, respectively, but the determination of receiving and transmitting beam correspondence may be performed by a different device.

For example, the determination of receiving and transmitting beam correspondence of the first and second communication devices described above may be performed at the first communication device (i.e., S3014 is performed by the first communication device), wherein the second communication device also provides feedback on its own maximum receiving beam to the first communication device at S3004 for the first communication device to perform S3014. The first communication device may inform the second communication device of the correspondence information of the second communication device by using the above described beam correspondence information of receiving and transmitting beams in the uplink/downlink communications. In some application scenarios of the Internet of Things based on the present example, it is expected to implement terminal devices with low complexity and low cost. Thus, it is preferably that the first communication device is implemented as a base station, and the second communication device is implemented as a terminal device. As another example, the determination of receiving and transmitting beam correspondence of the first and second communication devices described above may be performed at the second communication device (i.e., S3010 is performed by the second communication device), wherein the first communication device also provides feedback on its own maximum receiving beam to the second communication device at S3012 for the second communication device to perform S3010. The second communication device may inform the first communication device of the correspondence information of the first communication device by using the above described beam correspondence information of receiving and transmitting beams in the uplink/downlink communications.

Also by way of example, the determination of receiving and transmitting beam correspondence of the first communication device and the second communication device may be performed by other devices than the first and second communication devices, e.g., the first communication device is implemented as a TRP or a remote radio head RRH, and the second communication device is a terminal device, and the other device is a gNodeB. The other device can obtain information about the maximum receiving and transmitting beams of the first communication device to determine receiving and transmitting beam correspondence of the first communication device, and obtain information about the maximum receiving and transmitting beams of the second communication device to determine receiving and transmitting beam correspondence of the second communication device, and notify the first and second communication devices of beam correspondence information of their respective transmitting and receiving beams when beam sweeping is to be performed between the first and second communication devices, to help simplifying sweeping operations, or the other device directly determines simplified beam sweeping operations and configures the first and second communication devices.

Other forms of beam correspondence information, such as the correspondence information of the uplink and downlink beam pairs described above, may also be obtained in accordance with embodiments of the present invention.

For example, the first communication device, the second communication device, or the other device may determine whether the correspondence of the uplink and downlink beam pairs is complete correspondence, partial correspondence or no correspondence by comparing the maximum downlink transmitting-receiving beam pair with the maximum uplink receiving-transmitting beam pair.

Next, an electronic device used in a first communication device side and a communication method thereof according to an embodiment of the present disclosure will be described with reference to FIGS. 4 and 5.

Figure 4:
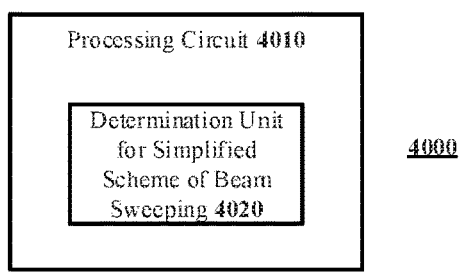
FIG. 4 is a configuration block diagram illustrating an electronic device used in a first communication device side, according to an embodiment of the present disclosure.

FIG. 4 illustrates a configuration block diagram of an electronic device 4000 used in a first communication device side, according to an embodiment of the present disclosure. In one embodiment, the electronic device 4000 can include a processing circuit 4010.

The processing circuit 4010 of the electronic device 4000 provides various functions of the electronic device 4000. In one embodiment of the present disclosure, the processing circuit 4010 of the electronic device 4000 may be configured to perform a simplified beam sweeping operation for the electronic device 4000 used in the first communication device side, such as the step S5000 in the communication method of the electronic device 4000 used in the first communication device side shown in FIG. 5 described later.

The processing circuit 4010 may refer to various implementations of digital circuitry, analog circuitry, or mixed signal (combination of analog and digital) circuitry that perform functions in a computing system. The processing circuit may include, for example, circuit such as an integrated circuit (IC), an application specific integrated circuit (ASIC), a portion or circuit of a separate processor core, an entire processor core, a separate processor, a programmable hardware device such as a field programmable gate array (FPGA), and/or a system including multiple processors.

In one embodiment, the processing circuit 4010 may include a determination unit 4020 for simplified scheme of beam sweeping configured to perform step S5000 in the communication method for the electronic device 4000 used in the first communication device side shown in FIG. 5 described later.

In one embodiment, the electronic device 4000 may also include a memory (not shown). The memory of the electronic device 4000 can store information generated by the processing circuit 4010 as well as programs and data for operations of the electronic device 4010. The memory can be a volatile memory and/or a non-volatile memory. For example, the memory can include, but is not limited to, random access memory (RAM), dynamic random access memory (DRAM), static random access memory (SRAM), read only memory (ROM), and flash memory.

Additionally, the electronic device 4000 can be implemented at a chip level, or can be implemented at a device level by including other external components. In one embodiment, the electronic device 4000 may be implemented as a first terminal device as a complete machine, and may also include multiple antennas.

It should be understood that the various units described above are only logical blocks that are divided according to the specific functions implemented by them, and are not intended to limit the specific implementation. In actual implementation, each of the above units may be implemented as a standalone physical entity, or may be implemented by a single entity (e.g., a processor (CPU or DSP), etc.), an integrated circuit, etc.).

Figure 5:
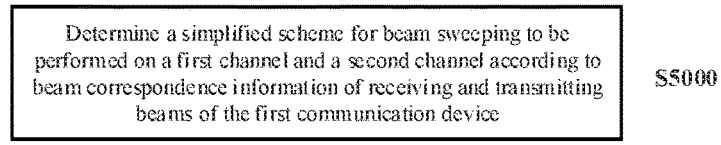
FIG. 5 is a flowchart illustrating a communication method for a first terminal device side of a wireless communication system according to an embodiment of the present disclosure.

FIG. 5 illustrates a flow chart for a communication method on a first communication device side, according to an embodiment of the present disclosure. This communication method can be used, for example, for the electronic device 4000 as shown in FIG. 4.

As illustrated in FIG. 5, in step S5000, determining, according to beam correspondence information of receiving and transmitting beams of the first communication device, a simplified scheme for beam sweeping which is to be executed on a first channel from the first communication device to a second communication device and a second channel from the second communication device to the first communication device.

According to an embodiment of the present disclosure, the simplified scheme for beam sweeping to be performed next can be determined according to the beam correspondence information of receiving and transmitting beams. By using the simplified scheme for beam sweeping, the maximum receiving and transmitting beams to be used by the communication devices on both sides of the communication link in the beam sweeping to be performed can be determined in a simplified manner, for the following transmission of data and/or control signals, thereby enabling reduction of the overhead of beam sweeping and reduction of consumption of system resources.

A signaling diagram of a simplified scheme for beam sweeping in accordance with an embodiment of the present disclosure will be described below in detail with reference to FIGS. 6-15.

In the case where the beam correspondence information of receiving and transmitting beams of the first communication device indicates that the first communication device has receiving and transmitting beam correspondence, the beam sweeping scheme of the first communication device may be simplified. For example, a simplified scheme for beam sweeping as shown in the signaling diagrams of FIGS. 6 and 7 can be employed.

In the case where the first communication device is a base station, the first communication device having receiving and transmitting beam correspondence may, for example, correspond to the situations illustrated in FIGS. 2A and 2B. In addition, in the case where the first communication device is a terminal device, the first communication device having receiving and transmitting beam correspondence may correspond to, for example, the situations illustrated in FIGS. 2A and 2C.

Figure 6:
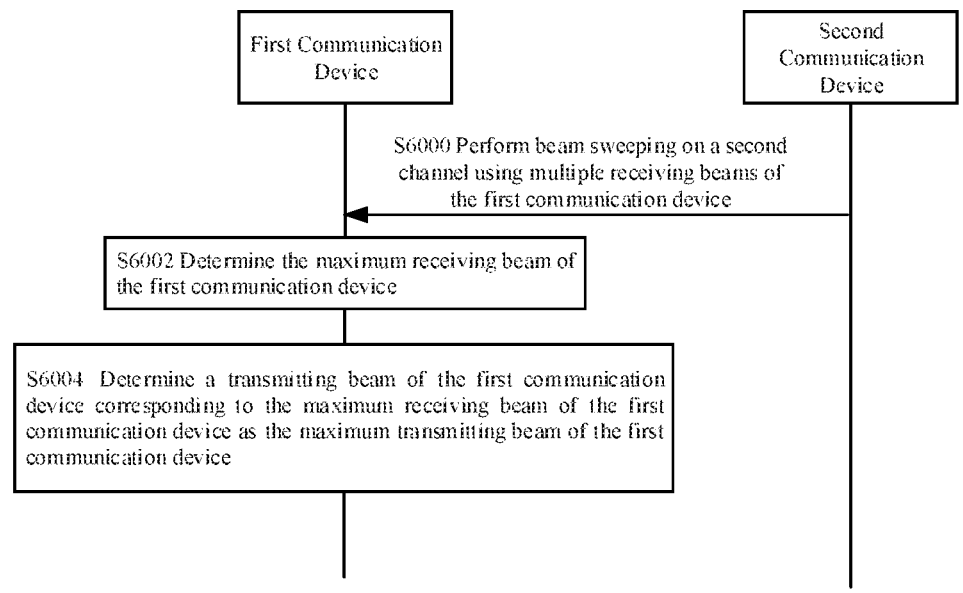
FIGS. 6-15 are signaling diagrams illustrating a simplified scheme for beam sweeping in accordance with an embodiment of the present disclosure.

In one embodiment, as shown in FIG. 6, in step S6000, beam sweeping on the second channel is performed using multiple receiving beams of the first communication device. In one embodiment, beam sweeping on the second channel may be performed by the first communication device by receiving a second reference signal on the second channel from the second communication device. The second reference signal may correspond to, for example, the second reference signal described with reference to step S3006 in FIG. 3.

In step S6002, the maximum receiving beam of the first communication device is determined on the first communication device side. In one embodiment, the maximum receiving beam of the first communication device may be determined by measuring the second reference signal (e.g., measuring received signal power (e.g., RSRP), channel quality (e.g., CQI) of the second reference signal).

Step S6000 and step S6002 may correspond to, for example, one of existing uplink beam sweeping and downlink beam sweeping. For example, in the case where the first communication device is a base station and the second communication device is a terminal device, steps S6000 and S6002 may correspond to the uplink beam sweeping described with reference to FIG. 1.

In step S6004, the transmitting beam of the first communication device corresponding to the maximum receiving beam of the first communication device is determined to be the maximum transmitting beam of the first communication device. In one embodiment, the transmitting beam that is the same as the maximum receiving beam of the first communication device is determined to be the maximum transmitting beam.

As an example, a transmitting beam "corresponding to" the maximum receiving beam may refer to the transmitting beam that is the same as the maximum receiving beam.

In this embodiment, since the first communication device has receiving and transmitting beam correspondence, the maximum transmitting beam is directly determined according to the maximum receiving beam of the first communication device, and it is not necessary to perform the determination by performing beam sweeping on the first channel.

Figure 7:
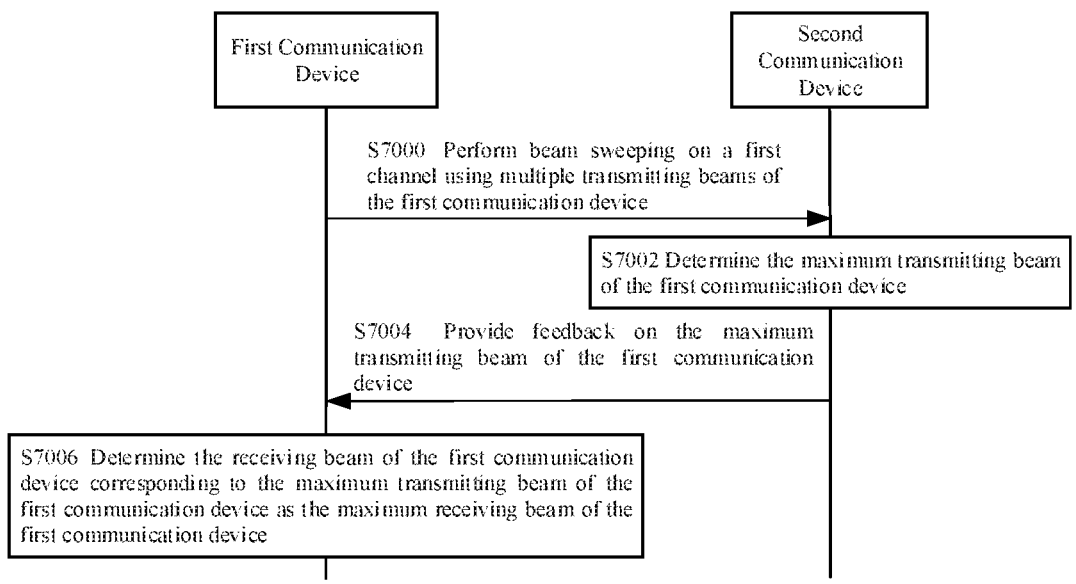

FIG. 7 shows a signaling diagram of another simplified scheme for beam sweeping in the case where beam correspondence information of receiving and transmitting beams of the first communication device indicates that the first communication device has receiving and transmitting beam correspondence.

As illustrated in FIG. 7, in step S7000, beam sweeping on the first channel is performed using multiple transmitting beams of the first communication device. In one embodiment, beam sweeping on the first channel may be performed by transmitting a first reference signal on the first channel from the first communication device to the second communication device. The first reference signal may correspond to, for example, the first reference signal described with reference to step S3000 in FIG. 3.

In step S7002, the maximum transmitting beam of the first communication device is determined on the second communication device side. In one embodiment, the maximum transmitting beam of the first communication device may be determined by measuring the first reference signal (e.g., measuring received signal power (e.g., RSRP), channel quality (e.g., CQI) of the first reference signal) at the second communication device side.

Step S7000 and step S7002 may correspond to, for example, one of existing uplink beam sweeping and downlink beam sweeping. For example, in the case where the first communication device is a base station and the second communication device is a terminal device, steps S7000 and S7002 may correspond to the downlink beam sweeping described with reference to FIG. 1.

In step S7004, the second communication device provides feedback on the maximum transmitting beam of the first communication device to the first communication device.

In step S7006, on the first communication device side, the receiving beam of the first communication device corresponding to the maximum transmitting beam of the first communication device is determined as the maximum receiving beam of the first communication device. In one embodiment, the same receiving beam as the maximum transmitting beam of the first communication device is determined as the maximum receiving beam.

As an example, a receiving beam that "corresponds" to the maximum transmitting beam may refer to the same receiving beam as the maximum transmitting beam.

In this embodiment, since the first communication device has receiving and transmitting beam correspondence, the maximum receiving beam is directly determined according to the maximum transmitting beam of the first communication device, and it is not necessary to perform the determination by performing beam sweeping on the second channel.

The simplified schemes for beam sweeping shown in FIG. 6 and FIG. 7 performs beam sweeping on only one of the first channel and the second channel, which can save the process of beam sweeping on the other channel, thereby reducing system overhead, as compared with the conventional scheme of using beam sweeping on two channels.

According to one embodiment of the present disclosure, in a case where the beam correspondence information of receiving and transmitting beams of the first communication device indicates that the first communication device has partial receiving and transmitting beam correspondence, the beam sweeping scheme for the first communication device may be simplified. For example, a simplified scheme for beam sweeping as shown in the signaling diagrams of FIGS. 8 and 9 can be employed.

The first communication device having partial receiving and transmitting beam correspondence may, for example, correspond to the situations illustrated on the base station side or the terminal device side of FIG. 2E.

Figure 8:
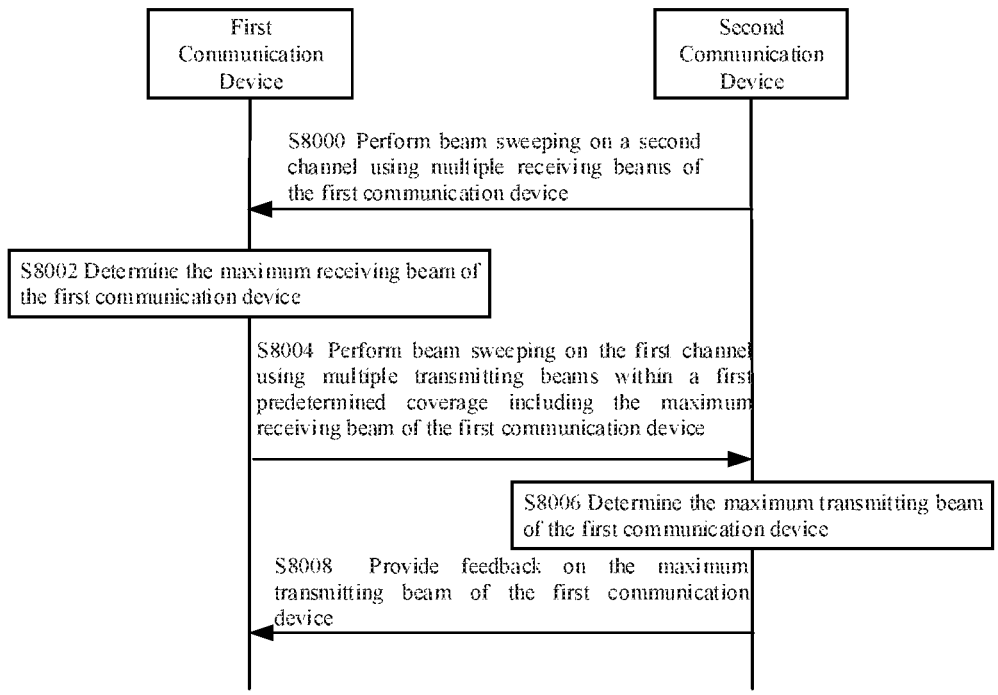

In one embodiment, as shown in FIG. 8, in step S8000, beam sweeping on the second channel is performed using multiple receiving beams of the first communication device. In step S8002, the maximum receiving beam of the first communication device is determined on the first communication device side. Steps S8000 and S8002 may correspond to, for example, steps S6000 and S6002 in FIG. 6, respectively.

In step S8004, beam sweeping on the first channel is performed using multiple transmitting beams within a first predetermined coverage including the maximum receiving beam of the first communication device. In step S8006, on the second communication device side, the maximum transmitting beam of the first communication device is determined. In step S8008, the second communication device provides feedback on the maximum transmitting beam of the first communication device to the first communication device.

In one embodiment, the first predetermined coverage including the maximum receiving beam of the first communication device in step S8004 may be determined based on the coverage of the maximum receiving beam of the first communication device, which, for example, may be a collection of the coverage of the maximum receiving beam of the first communication device and the coverage of the transmitting beam of the first communication device corresponding to the maximum receiving beam.

As an example, a transmitting beam that "corresponds" to the maximum receiving beam may refer to a transmitting beam that at least partially overlaps (e.g., has an intersection) with the maximum receiving beam.

For example, when the coverage of the maximum receiving beam of the first communication device contains several transmitting beams completely, the first predetermined coverage is the coverage of the maximum receiving beam (i.e., the several transmitting beams); if the maximum receiving beam of the communication device is completely contained in one transmitting beam, then the first predetermined coverage is the coverage of the transmitting beam; if the coverage of the maximum receiving beam of the first communication device partially overlaps the coverage of several transmitting beams, then the first predetermined coverage is the coverage formed collectively by the coverage of all transmitting beams partially overlapping with the maximum receiving beam.

For example, as shown in FIG. 2E, the base station 2000 has partial receiving and transmitting beam correspondence, then the first predetermined coverage on the base station 2000 side may be a collection of the coverage of the maximum receiving beam 2006 and the coverage of the corresponding transmitting beam 2004. In addition, since the coverage of the maximum receiving beam 2006 includes the coverage of the transmitting beam 2004, the first predetermined coverage on the base station 2000 side shown in FIG. 2E is the coverage of the maximum receiving beam 2006. In addition, in FIG. 2E, the terminal device 2002 also has partial receiving and transmitting beam correspondence, and likewise, the first predetermined coverage on the terminal device 2002 side may be the coverage of the maximum receiving beam 2010.

According to one embodiment of the present disclosure, the said first predetermined coverage may be acquired by pre-configuring the first communication device. In one embodiment, the beamforming capability of the first communication device can be pre-configured. The beamforming capability may, for example, include the number of beams and coverage information for each beam. Further, the first predetermined coverage may be determined according to the beamforming capability of the first communication device.

In the simplified scheme for beam sweeping as shown in FIG. 8, since the first communication device has partial receiving and transmitting beam correspondence, beam sweeping on the first channel is not required to be performed for all the transmitting beams of the first communication device in step S8004. Instead, beam sweeping on the first channel is performed only for multiple transmitting beams within a first predetermined range. Therefore, the range of beam sweeping on the first channel is reduced, which can save the overhead of beam sweeping on the first channel, thereby reducing system overhead.

Figure 9:
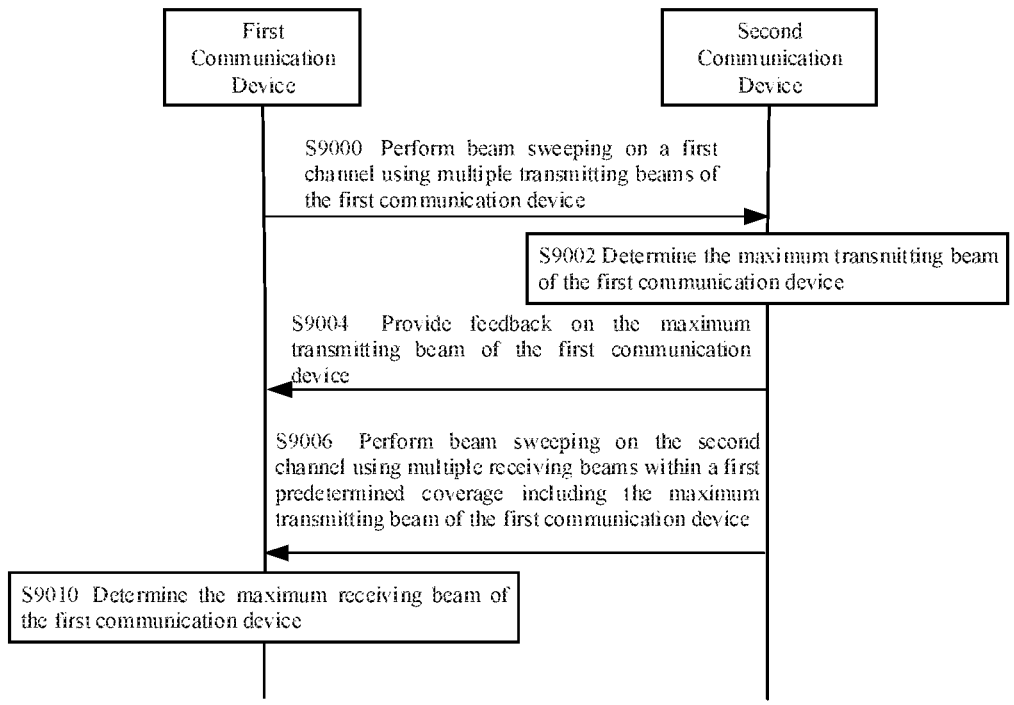

FIG. 9 illustrates a signaling diagram of another simplified scheme for a beam sweeping in the case where beam correspondence information of receiving and transmitting beams of the first communication device indicates that the first communication device has partial receiving and transmitting beam correspondence.

As illustrated in FIG. 9, in step S9000, beam sweeping on the first channel is performed using multiple transmitting beams of the first communication device. In step S9002, the maximum transmitting beam of the first communication device is determined on the second communication device side. In step S9004, the second communication device provides feedback on the maximum transmitting beam of the first communication device to the first communication device. Steps S9000 to S9004 may correspond to, for example, steps S7000 to S7004 in FIG. 7, respectively.

In step S9006, beam sweeping on the second channel is performed using multiple receiving beams within a first predetermined coverage including the maximum transmitting beam of the first communication device. In step S9008, the maximum receiving beam of the first communication device is determined on the first communication device side.

In one embodiment, the first predetermined coverage including the maximum transmitting beam of the first communication device in step S9006 may be determined based on the coverage of the maximum transmitting beam of the first communication device, which, for example, may be a collection of the coverage of the maximum transmitting beam of the first communication device and the coverage of the receiving beam of the first communication device corresponding to the maximum transmitting beam.

As an example, a receiving beam that "corresponds" to the maximum transmitting beam may refer to a receiving beam that at least partially overlaps (e.g., has an intersection) with the maximum transmitting beam.

For example, as shown in FIG. 2E, the base station 2000 has partial receiving and transmitting beam correspondence, then the first predetermined coverage on the base station 2000 side may be a collection of the coverage of the maximum transmitting beam 2004 and the coverage of the corresponding receiving beam 2006. In addition, since the coverage of the maximum transmitting beam 2004 is included in the coverage of the receiving beam 2006, the first predetermined coverage on the base station 2000 side shown in FIG. 2E is the coverage of the receiving beam 2006 corresponding to the maximum transmitting beam 2004. In addition, in FIG. 2E, the terminal device 2002 also has partial receiving and transmitting beam correspondence, and similarly, the first predetermined coverage on the terminal device 2002 side may be the coverage of the receiving beam 2010 corresponding to the maximum transmitting beam 2008.

In the simplified scheme for beam sweeping as shown in FIG. 9, since the first communication device has partial receiving and transmitting beam correspondence, beam sweeping on the second channel is not required to be performed for all receiving beams of the first communication device in step S9006. Instead, beam sweeping on the second channel is performed only for multiple receiving beams within a first predetermined range. Therefore, the range of beam sweeping on the second channel is reduced, which can save the overhead of beam sweeping on the second channel, thereby reducing system overhead.

A simplified scheme for determining beam sweeping for a first communication device according to beam correspondence information of receiving and transmitting beams of the first communication device is described above with reference to FIGS. 6-9. In an embodiment of the present disclosure, it is also possible to simultaneously consider the beam correspondence information of receiving and transmitting beams of the first communication device and the second communication device to determine a simplified scheme for beam sweeping for the first communication device and the second communication device. Next, a detailed description will be made with reference to the signaling diagrams of the simplified schemes for beam sweeping according to an embodiment of the present disclosure shown in FIGS. 10-15.

According to one embodiment of the present disclosure, the first communication device may acquire the beam correspondence information of receiving and transmitting beams of the second communication device from the second communication device.

According to one embodiment of the present disclosure, the beam sweeping scheme of the first communication device and the second communication device may be simplified in a case where the first communication device has receiving and transmitting beam correspondence and the second communication device also has receiving and transmitting beam correspondence.

Figure 10:
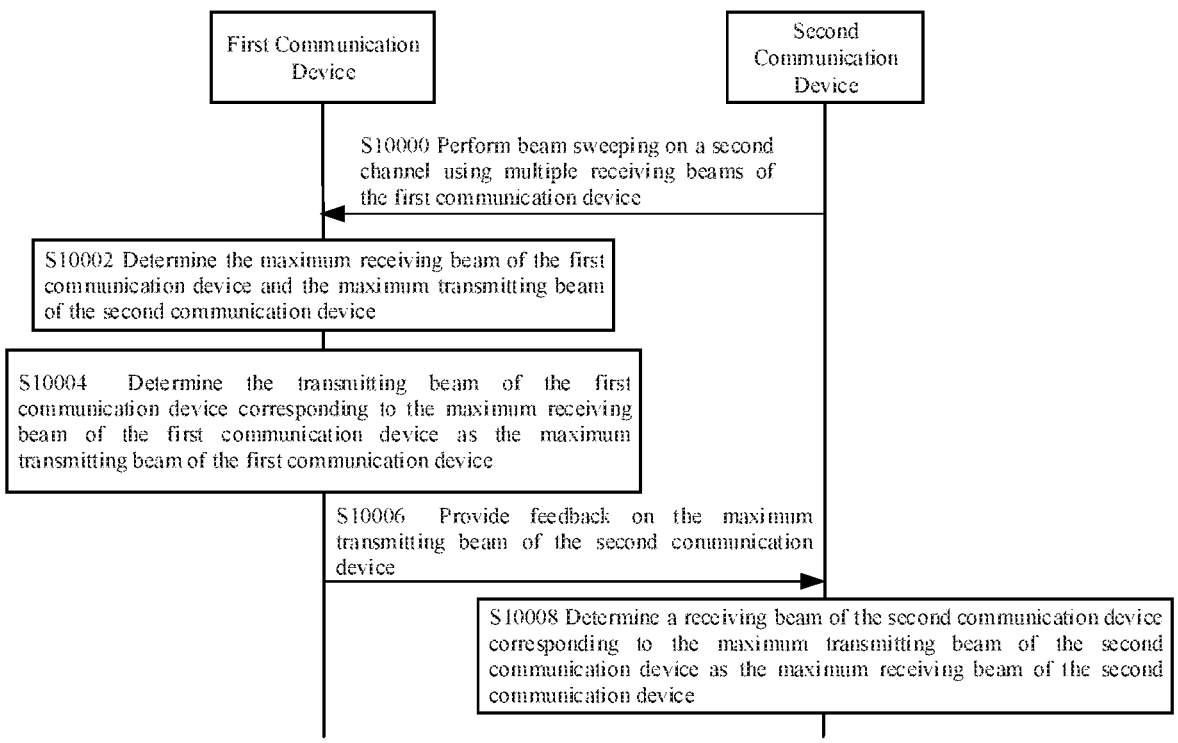

FIG. 10 illustrates a signaling diagram of a simplified scheme for beam sweeping in the case where both the first communication device and the second communication device have receiving and transmitting beam correspondence.

Steps S10000 to S10004 shown in FIG. 10 are similar to steps S6000 to S6004 shown in FIG. 6, except that in step S10002, in addition to determining the maximum receiving beam of the first communication device, the maximum transmitting beam of the second communication device is determined.

In addition, in step S10006, the first communication device provides feedback on the maximum transmitting beam of the second communication device to the second communication device. In step S10008, on the second communication device side, a receiving beam of the second communication device that is corresponding to, for example, the same as, the maximum transmitting beam of the second communication device is determined as the maximum receiving beam of the second communication device.

In addition, the steps shown in FIG. 10 may not be performed in the order shown in the drawing. For example, step S10006 may be performed before step S10004, or may be performed in parallel with step S10004.

In this embodiment, in addition to the first communication device having receiving and transmitting beam correspondence, the second communication device also has receiving and transmitting beam correspondence. Thus, the maximum receiving beam of the second communication device can be determined based on the maximum transmitting beam of the second communication device determined from the beam sweeping on the second channel. In this embodiment, it is not necessary for the first communication device to perform a transmitting beam sweeping on the first channel to determine the maximum receiving beam of the second communication device.

Figure 11:
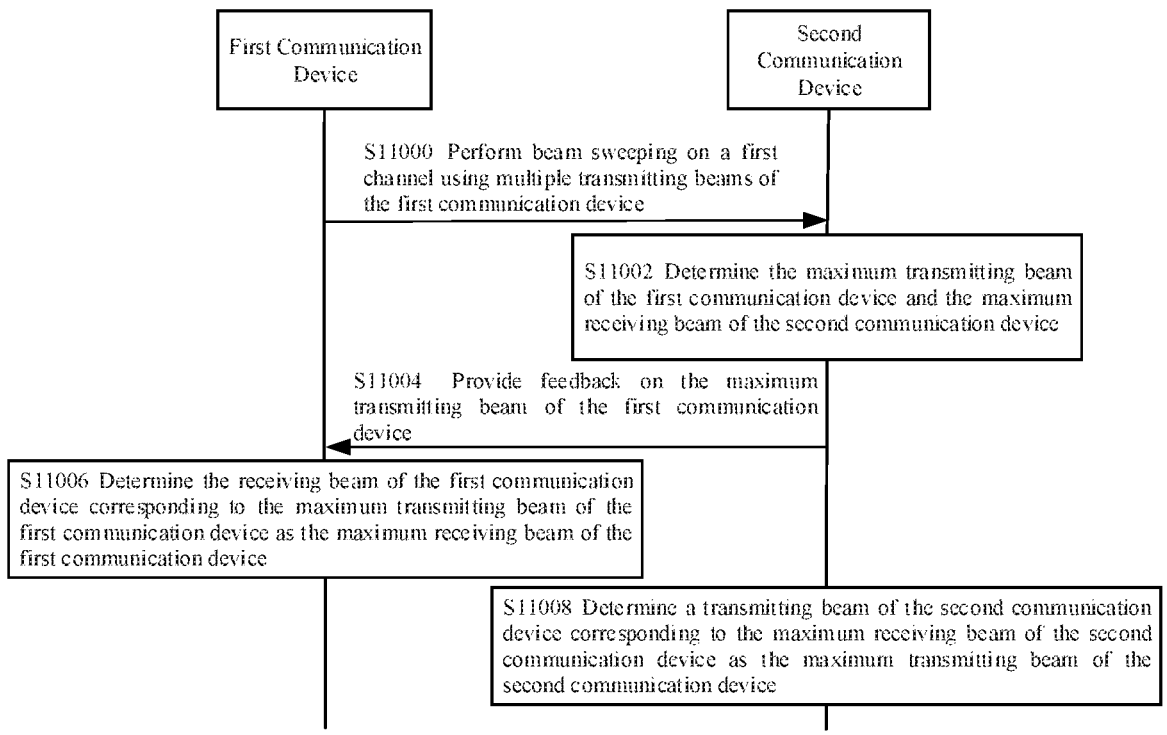

FIG. 11 illustrates a signaling diagram of another simplified scheme for beam sweeping in the case where both the first communication device and the second communication device have receiving and transmitting beam correspondence.

Steps S11000 to S11006 of FIG. 11 are similar to steps S7000 to S7006 of FIG. 7, except that in step S11002, in addition to determining the maximum transmitting beam of the first communication device, the maximum receiving beam of the second communication device is also determined.

In addition, in step S11008, on the second communication device side, a transmitting beam of the second communication device that is corresponding to, for example, the same as, the maximum receiving beam of the second communication device is determined to be the maximum transmitting beam of the second communication device.

In addition, the steps shown in FIG. 11 may not be performed in the order shown in the drawing. For example, step S11008 may be performed before step S11004 or step S11006, or may be performed in parallel with step S11004 or step S11006.

In this embodiment, since the second communication device also has receiving and transmitting beam correspondence, the maximum transmitting beam can be determined directly from the maximum receiving beam of the second communication device determined in step S11002. In this embodiment, it is not necessary for the second communication device to perform a transmitting beam sweeping on the second channel to determine the maximum transmitting beam of the second communication device The simplified schemes for beam sweeping shown in FIG. 10 and FIG. 11 performs beam sweeping on only one of the first channel and the second channel, which can save the process of beam sweeping on one channel, thereby reducing system overhead, as compared with existing beam sweeping schemes.

According to one embodiment of the present disclosure, the beam sweeping scheme for the first communication device and the second communication device may be simplified in a case where the first communication device has receiving and transmitting beam correspondence and the second communication device does not have receiving and transmitting beam correspondence.

Figure 12:
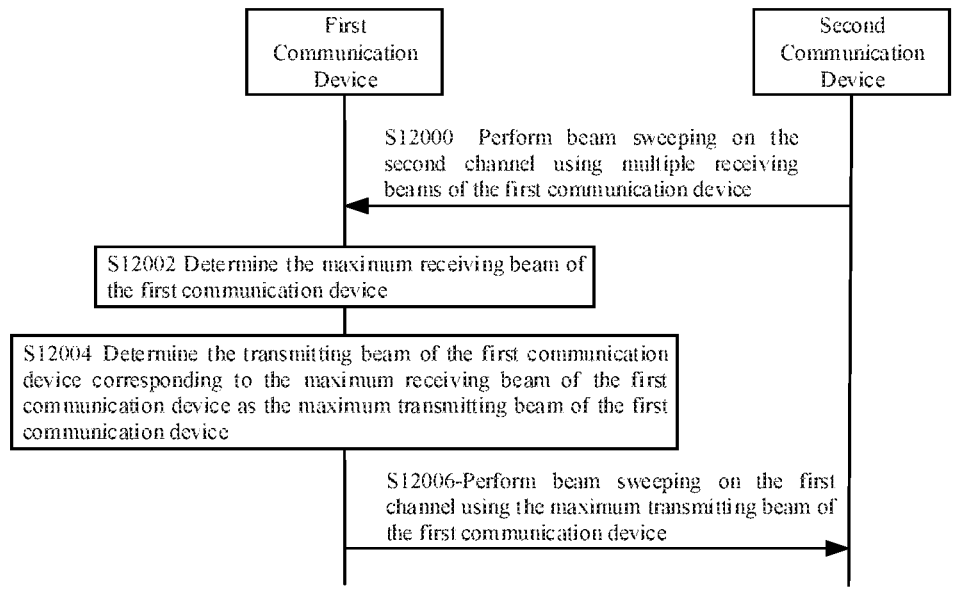

FIG. 12 illustrates a signaling diagram of a simplified scheme for beam sweeping in the case where the first communication device has receiving and transmitting beam correspondence and the second communication device does not have receiving and transmitting beam correspondence.

Steps S12000 to S12004 in FIG. 12 may correspond to, for example, steps S6000 to S6004 in FIG. 6.

In addition, in step S12006, beam sweeping on the first channel is performed using the maximum transmitting beam of the first communication device. The maximum receiving beam of the second communication device can be determined by beam sweeping on the first channel.

In this embodiment, the beam sweeping on the first channel is performed using only the maximum transmitting beam of the first communication device, which, as compared with conventional schemes that require the use of all transmitting beams of the first communication device for beam sweeping on the first channel, can reduce the range of beam sweeping, thereby saving system overhead.

Figure 13:
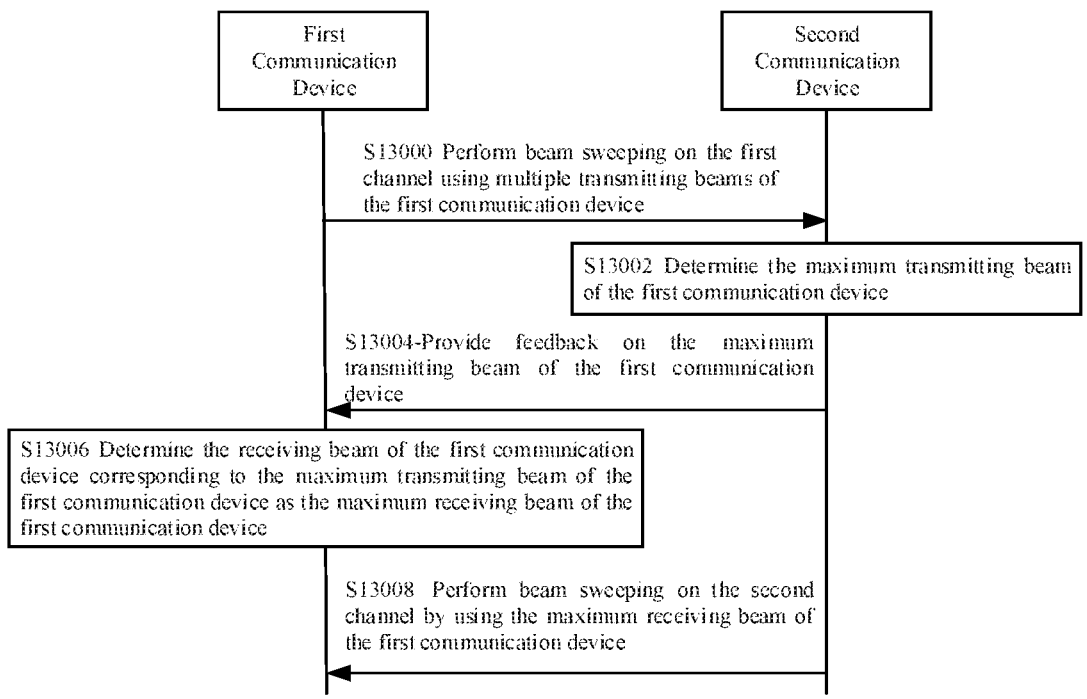

FIG. 13 illustrates a signaling diagram of another simplified scheme for beam sweeping in the case where the first communication device has receiving and transmitting beam correspondence and the second communication device does not have receiving and transmitting beam correspondence.

Steps S13000 to S13006 in FIG. 13 may correspond to, for example, steps S7000 to S7006 in FIG. 7, respectively.

In addition, in step S13008, beam sweeping on the second channel is performed using the maximum receiving beam of the first communication device. The maximum transmitting beam of the second communication device can be determined by beam sweeping on the second channel.

In this embodiment, beam sweeping on the second channel is performed using only the maximum receiving beam of the first communication device, which, as compared with conventional schemes that require the use of all receiving beams of the first communication device for beam sweeping, can reduce the range of beam sweeping, thereby saving system overhead.

According to one embodiment of the present disclosure, in a case where the first communication device has partial receiving and transmitting beam correspondence and the second communication device has partial receiving and transmitting beam correspondence, the beam sweeping schemes for the first communication device and the second communication device may also be simplified.

Figure 14:
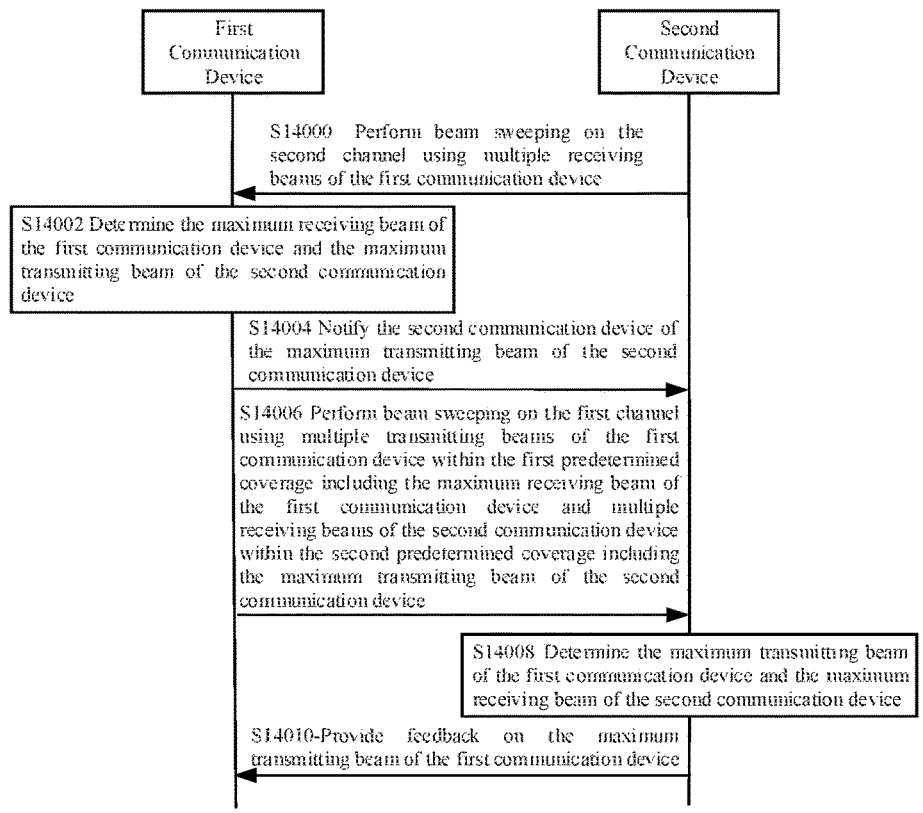

FIG. 14 illustrates a signaling diagram of a simplified scheme for beam sweeping in the case where the first communication device has partial receiving and transmitting beam correspondence and the second communication device has partial receiving and transmitting beam correspondence.

Steps S14000 to S14002 in FIG. 14 are similar to steps S8000 to S8002 in FIG. 8 except that in step S14002, in addition to determining the maximum receiving beam of the first communication device, the maximum transmitting beam of the second communication device is also determined.

In addition, in step S14004, the first communication device provides feedback on the maximum transmitting beam of the second communication device to the second communication device. In step S14006, beam sweeping on the first channel is performed by using multiple transmitting beams of the first communication device within the first predetermined coverage including the maximum receiving beam of the first communication device and multiple receiving beams of the second communication device within the second predetermined coverage including the maximum transmitting beam of the second communication device. In step S14008, the maximum transmitting beam of the first communication device and the maximum receiving beam of the second communication device are determined on the second communication device side. In step S14010, the second communication device provides feedback on the maximum transmitting beam of the first communication device to the first communication device.

In one embodiment, the first predetermined coverage in step S14006 may correspond to the first predetermined coverage in step S8004 described with reference to FIG. 8. In addition, the second predetermined coverage of the second communication device including the maximum transmitting beam of the second communication device in step S14006 may be determined based on the coverage of the maximum transmitting beam of the second communication device, which, for example, may be a collection of the coverage of the maximum transmitting beam of the second communication device and the coverage of the receiving beam of the second communication device corresponding to the maximum transmitting beam.

As an example, a receiving beam that "corresponds" to the maximum transmitting beam may refer to a receiving beam that at least partially overlaps (e.g., has an intersection) with the maximum transmitting beam.

For example, when the coverage of the maximum transmitting beam of the second communication device contains several receiving beams completely, the second predetermined coverage is the coverage of the maximum transmitting beam (i.e., the several receiving beams); if the maximum transmitting beam of the second communication device is completely contained in one receiving beam, then the second predetermined coverage is the coverage of the receiving beam; if the coverage of the maximum transmitting beam of the second communication device partially overlaps the coverage of several receiving beams, then the second predetermined coverage is the coverage formed collectively by the coverage of all receiving beams partially overlapping with the maximum transmitting beam.

For example, as shown in FIG. 2E, the base station 2000 has partial receiving and transmitting beam correspondence, and the second predetermined coverage on the base station 2000 side may be a collection of the coverage of the maximum transmitting beam 2004 and the coverage of the corresponding receiving beam 2006. In addition, since the coverage of the maximum transmitting beam 2004 is included in the coverage of the receiving beam 2006, the second predetermined coverage on the base station 2000 side shown in FIG. 2E is the coverage of the receiving beam 2006 corresponding to the maximum transmitting beam 2004. In addition, in FIG. 2E, the terminal device 2002 also has partial receiving and transmitting beam correspondence, and similarly, the second predetermined coverage on the terminal device 2002 side may be the coverage of the receiving beam 2010 corresponding to the maximum transmitting beam 2008.

According to one embodiment of the present disclosure, the second predetermined coverage may be acquired by pre-configuring the second communication device. In one embodiment, the beamforming capability of the second communication device can be pre-configured. The beamforming capability may, for example, include the number of beams and coverage information for each beam. In one embodiment, the first communication device can acquire the beamforming capability of the second communication device from the second communication device. Further, the first communication device can determine the second predetermined coverage according to the beamforming capability of the second communication device.

In the simplified scheme for beam sweeping as shown in FIG. 14, since both the first communication device and the second communication device have partial receiving and transmitting beam correspondence, in step S14006, when performing beam sweeping on the first channel, it is not necessary to traverse all of transmitting beams of the first communication device and all of receiving beams of the second communication device. Instead, channel sweeping on the first channel is performed only for multiple transmitting beams within the first predetermined range and multiple receiving beams within the second predetermined range. Therefore, the range of beam sweeping on the first channel is reduced, which can save the overhead of beam sweeping.

Figure 15:
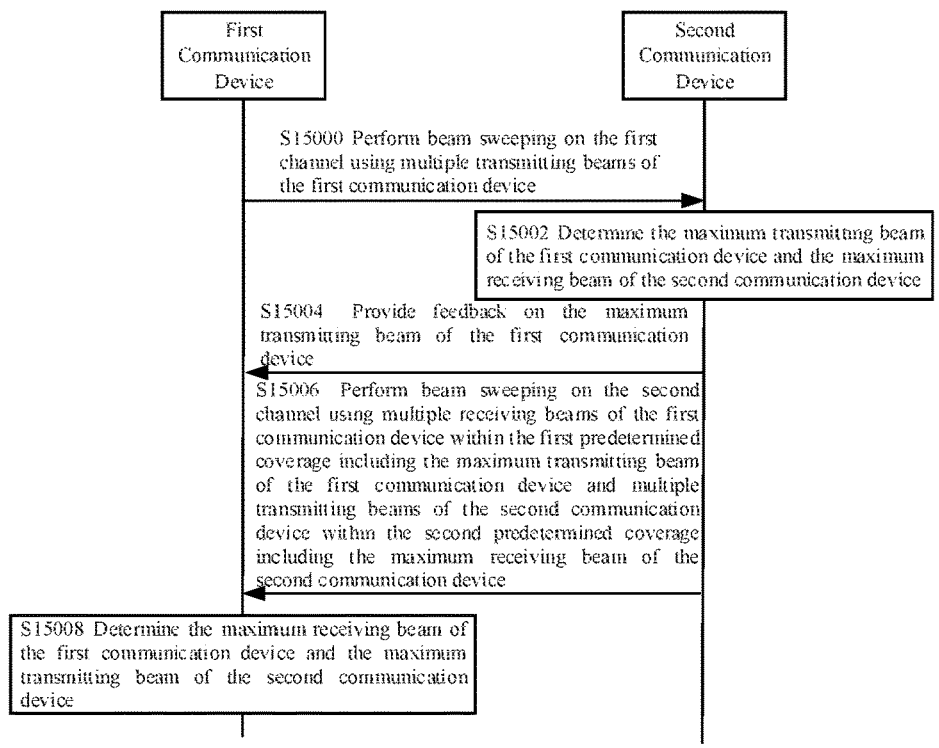

FIG. 15 illustrates a signaling diagram of another simplified scheme for beam sweeping in the case where the first communication device has partial receiving and transmitting beam correspondence and the second communication device has partial receiving and transmitting beam correspondence.

Steps S15000 to S15004 in FIG. 15 are similar to steps S9000 to S9004 in FIG. 9 except that in step S15002, in addition to determining the maximum transmitting beam of the first communication device, the maximum receiving beam of the second communication device is also determined.

In addition, in step S15006, beam sweeping on the second channel is performed using multiple receiving beams of the first communication device within the first predetermined coverage including the maximum transmitting beam of the first communication device and multiple transmitting beams of the second communication device within the second predetermined coverage including the maximum receiving beam of the second communication device. In step S15008, the maximum receiving beam of the first communication device and the maximum transmitting beam of the second communication device are determined on the first communication device side.

In one embodiment, the first coverage in step S15006 may correspond to the first coverage in step S9006 described with reference to FIG. 9. In addition, the second predetermined coverage including the maximum receiving beam of the second communication device in step S15006 may be a collection of the coverage of the maximum receiving beam of the second communication device and the coverage of the transmitting beam of the second communication device corresponding to the maximum receiving beam.

As an example, a transmitting beam that "corresponds" to the maximum receiving beam may refer to a transmitting beam that at least partially overlaps (e.g., has an intersection) with the maximum receiving beam.

For example, as shown in FIG. 2E, the base station 2000 has partial receiving and transmitting beam correspondence, and the second predetermined coverage on the base station 2000 side may be a collection of the coverage of the maximum receiving beam 2006 and the coverage of the corresponding transmitting beam 2006. In addition, since the coverage of the maximum receiving beam 2006 includes the coverage of the transmitting beam 2004, the second predetermined coverage on the base station 2000 side shown in FIG. 2E is the coverage of the maximum receiving beam 2006. In addition, in FIG. 2E, the terminal device 2002 also has partial receiving and transmitting beam correspondence, and similarly, the second predetermined coverage on the terminal device 2002 side may be the coverage of the maximum receiving beam 2010.

In the simplified scheme for beam sweeping as shown in FIG. 15, since both the first communication device and the second communication device have partial receiving and transmitting beam correspondence, in step S15006, when performing beam sweeping on the second channel, it is not necessary to traverse all receiving beams of the first communication device and all transmitting beams of the second communication device. Instead, channel sweeping on the second channel is performed only for multiple receiving beams within the first predetermined range and multiple transmitting beams within the second predetermined range. Therefore, the range of beam sweeping on the second channel is reduced, which can save the overhead of beam sweeping.

The simplified beam sweeping operations described above is primarily described with reference to beam correspondence information of receiving and transmitting beams, but it should be understood that the simplified beam sweeping operations can also be performed with reference to other types of beam correspondence information.

For example, simplified beam sweeping can be performed based on correspondence information of uplink and downlink beam pairs. When the uplink and downlink beam pairs have completely correspondence, the simplified beam sweeping can be performed similarly to the case where the first and second communication devices both have receiving and transmitting beam correspondence described above; when the uplink and downlink beam pairs have partial correspondence, the simplified beam sweeping can be generally performed as in the case that both the first and second communication devices are considered to have partial receiving and transmitting beam correspondence; while when the uplink and downlink beam pairs do not have correspondence, the beam sweeping can be generally performed as in the case that both the first and second communication devices are considered to have no receiving and transmitting beam correspondence, that is, conventional traversal beam sweeping is performed.

Compared with conventional beam sweeping operations, the simplified beam sweeping operations performed according to the correspondence information of the uplink and downlink beam pairs can reduce the range of beam sweeping on the first and/or second channels, which can save the overhead of beam sweeping.

As another example, in a case where the uplink and downlink beam pairs have partial correspondence or no correspondence, the respective receiving and transmitting beam correspondence of the first and second communication devices may be further determined, such that the first and second communication devices perform simplified beam sweeping according to respective transmitting and receiving beam correspondence, as described above.

According to one embodiment of the present disclosure, the first communication device can include multiple antenna sub-arrays, each of which may include multiple receiving beams and multiple transmitting beams as described above. Likewise, the second communication device can also include multiple antenna sub-arrays. For example, four antenna sub-arrays are disposed in four directions including up, down, left, and right directions of the terminal device. In the various signaling flows given by the foregoing embodiments of the present disclosure, the beam correspondence information of receiving and transmitting beams of multiple antenna sub-arrays need to be transmitted. For example, several bits need to be added in the BCI to indicate the ID of the antenna sub-array. A specific example is shown in Table 3 below, in which 2 bits are added to the BCI to distinguish between 4 sub-arrays. That is, the BCI is represented by 3 bits, where the first and second bits are used to indicate the ID of the antenna sub-array, and the third bit is used to indicate the receiving and transmitting beam correspondence. As shown in Table 3, the sub-arrays 1 and 4 have receiving and transmitting beam correspondence (the third bit is "0"), and the sub-arrays 2 and 3 do not have receiving and transmitting beam correspondence (the third bit is "1"). It should be understood that Table 3 shows that one bit in the BCI is used to indicate beam correspondence, but more bits may be used to represent the beam correspondence information or the correspondence information of the uplink and downlink beam pairs described above. In this embodiment, the two communication devices may also select a specific sub-array pair for data transmission according to beam correspondence. For example, it is preferred to select a sub-array pair having correspondence of the uplink and downlink beam pairs to perform data transmission. In addition, in the case where one party of the communication devices has the right of control and the other party passively obeys, one party may notify the other party's communication device of the other party's sub-array ID in its selected sub-array pair.

TABLE 3

| | Sub-array 1 | Sub-array 2 | Sub-array 3 | Sub-array 4 |
|---|---|---|---|---|
| BCI | 000 | 011 | 101 | 110 |

In one embodiment, a simplified scheme for beam sweeping of each of the multiple antenna sub-arrays can be determined according to the beam correspondence information of the multiple receiving and transmitting beams of the first communication device each corresponding to the multiple antenna sub-arrays of the first communication device.

In one embodiment, a simplified scheme for beam sweeping of each of the multiple antenna sub-arrays of the first communication device and the second communication device can be determined according to the beam correspondence information of the multiple receiving and transmitting beams of the first communication device each corresponding to the multiple antenna sub-arrays of the first communication device and the beam correspondence information of the multiple receiving and transmitting beam of the second communication device each corresponding to the multiple antenna sub-arrays of the second communication device.

In one embodiment, one or more of the multiple antenna sub-arrays of the terminal device may be set as a working sub-array (e.g., a sub-array having optimal transmitting and receiving quality and/or having receiving and transmitting beam correspondence is set as the working sub-array), while other sub-arrays are set as backup sub-arrays. When the working sub-array fails, the backup sub-arrays are enabled and a simplified scheme for beam sweeping for the backup sub-arrays is determined by using the beam correspondence information of receiving and transmitting beams corresponding to the backup sub-arrays.

In wireless communication systems, beam correspondence may be lost due to various factors (such as interference, uplink and downlink calibration errors, beam quantization errors, hardware aging, temperature changes, uplink and downlink carrier distance changes, etc.). That is, beam correspondence is not constant between a base station and a terminal device. The measurement and reporting of beam correspondence can be performed periodically or non-periodically.

In one embodiment, the measurement and reporting of beam correspondence may be associated with a beam sweeping process.

For example, if the beam sweeping process is periodic, which is K subframes, the measurement and reporting of beam correspondence is also periodic, and may be NK subframes, where K, N are integers greater than or equal to 1. For example, the period of measurement and reporting of beam correspondence may be the same as the period of beam sweeping, that is, N=1, which is actually equivalent to performing beam correspondence measurement while at the same time completing beam sweeping. In addition, since the beam correspondence is generally relatively stable, the rate of change thereof is slower than the rate of change of the maximum receiving and transmitting beams. Preferably, the period of measurement and reporting of the beam correspondence is longer than the period of the beam sweeping, i.e., N>1. A simplified scheme for beam sweeping can be directly adopted for a period of time after the beam correspondence is determined, thereby effectively reducing the overhead of beam training.

Figure 16:
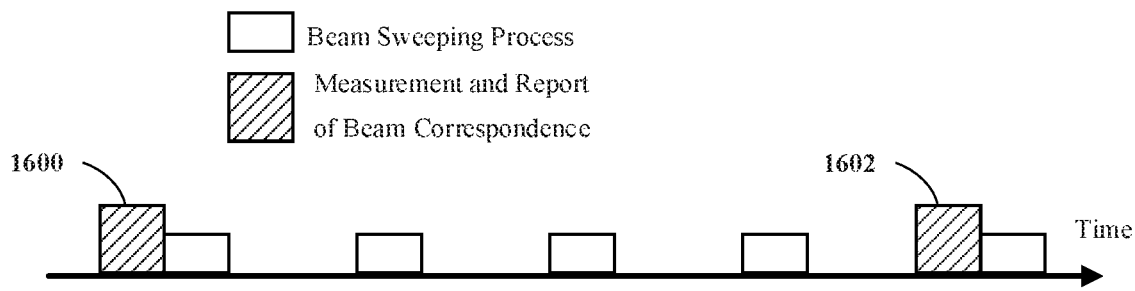
FIG. 16 is a diagram illustrating a relationship between measurement and reporting of beam correspondence and a beam sweeping process on a time scale, according to an embodiment of the present disclosure.

As an example, FIG. 16 illustrates a relationship between measurement and reporting of beam correspondence and a beam sweeping process on a time scale, where a blank block represents a beam sweeping process and a shaded block represents beam correspondence measurement and reporting, in accordance with an embodiment of the present disclosure. In FIG. 16, the period of measurement and reporting of beam correspondence is four times the period of beam sweeping, that is, N=4. In this case, after performing the measurement and reporting of the beam correspondence indicated with the shaded block 1600 and determining the beam correspondence information, and prior to performing the next measurement and reporting of beam correspondence (indicated with shaded block 1602), a simplified scheme for beam sweeping can be performed directly according to the beam correspondence information determined in the shaded block 1600.

In addition, if the beam sweeping process is non-periodic, the measurement and reporting of beam correspondence can also be non-periodic and can be triggered by a common trigger condition. For example, the beam sweeping process and measurement and reporting of beam correspondence are triggered with a change in carrier distance. For another example, the base station triggers the terminal device to perform non-periodic correspondence measurement and reporting according to the transmission status and communication requirements (for example, the degradation of communication quality). In one specific example, the base station configures the terminal device to perform periodic or non-periodic beam correspondence measurement and reporting through RRC signaling of the RRC sublayer.

In one embodiment, the beamforming capability of the base station and the terminal device may be determined in advance. The beamforming capability includes, for example, the number of beams of the receiving and transmitting beams, and the width of beams. The base station can acquire the beamforming capability of the terminal device, and determine the configuration information of uplink and downlink beam correspondence measurement based on the beamforming capability of the terminal device. The configuration information of uplink and downlink beam correspondence measurement may include, for example, the number of transmissions and receptions of each beam of the base station and the terminal device, the time-frequency resources occupied by each beam, the start time of the uplink and downlink beam correspondence detection, and the like. The base station may notify the terminal device of the configuration information of uplink and downlink beam correspondence measurement, for measurement of beam correspondence.

In one embodiment, the determination of the simplified scheme for beam sweeping can be performed periodically. The period can be the same as the period of measurement and reporting of beam correspondence.

In another embodiment, the determination of the simplified scheme for beam sweeping may be performed when beam correspondence information of receiving and transmitting beams of the first communication device changes. For example, when the beam correspondence measurement shows that the beam correspondence is different from the previous measurement result, a simplified scheme for beam sweeping is re-determined.

In another embodiment, the determination of the simplified scheme for beam sweeping can be triggered based on an event. For example, a simplified scheme for beam sweeping is re-determined in the event of a change in carrier distance.

Use cases according to the present disclosure will be described below.

The technology of the present disclosure can be applied to various products.

For example, the base station can be implemented as any type of evolved Node B (eNB) or a gNodeB (gNB) in the next generation radio access technology, such as macro eNB/gNB and small eNB/gNB. The small eNB/gNB may be an eNB/gNB covering a cell smaller than a macro cell, such as a pico eNB/gNB, a micro eNB/gNB, and a home (femto) eNB/gNB. Alternatively, the base station can be implemented as any other type of base station, such as one or both of a Base Transceiver Station (BTS) and a Base Station Controller (BSC) in the GSM system, can be one or both of a Radio Network Controller (RNC) and a NodeB in a WCDMA system, or can be a corresponding network node in a future communication system. The base station can include: a main body (also referred to as a base station device) configured to control wireless communication; and one or more remote wireless heads (RRHs) disposed at a different place than the main body. In addition, various types of terminals, which will be described below, can all operate as a base station by executing a base station function temporarily or semi-persistently.

For example, the terminal device can be implemented as a mobile terminal (such as a smartphone, a tablet personal computer (PC), a notebook PC, a portable game terminal, a drone, a portable/dongle type mobile router, and a digital camcorder apparatus) or an in-vehicle terminal (such as a car navigation device). The terminal device can also be implemented as a terminal (also referred to as a machine type communication (MTC) terminal) that performs machine-to-machine (M2M) communication. Furthermore, the terminal device may be a wireless communication module (such as an integrated circuit module including a single wafer) installed on each of the above terminals.

[Application Cases of the Base Station]

(First Application Case)

Figure 17:
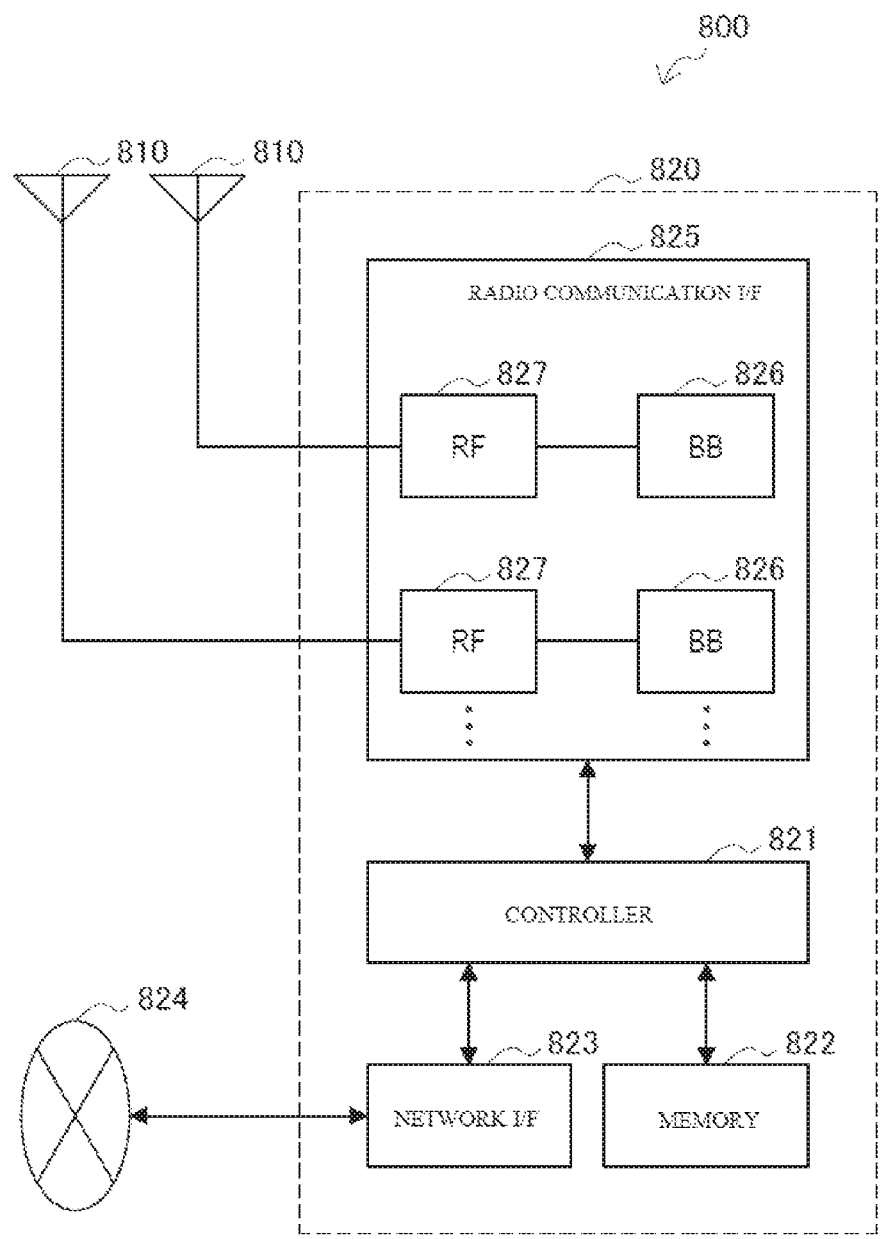
FIG. 17 is a block diagram illustrating a first example of an exemplary configuration of a gNB according to an embodiment of the present disclosure.

FIG. 17 is a block diagram illustrating a first example of a schematic configuration of a gNB to which the technology of the present disclosure can be applied. The gNB 800 includes one or more antennas 810 and a base station device 820. The base station device 820 and each antenna 810 may be connected to each other via an RF cable.

Each of the antennas 810 includes a single antenna element or multiple antenna elements (such as multiple antenna elements included in a Multiple Input Multiple Output (MIMO) antenna), and is used by the base station device 820 for transmitting and receiving radio signals. As illustrated in FIG. 17, the gNB 800 may include multiple antennas 810. For example, the multiple antennas 810 may be compatible with multiple frequency bands used by the gNB 800. The base station device 820 includes a controller 821, a memory 822, a network interface 823, and a radio communication interface 825.

The controller 821 may be, for example, a CPU or a DSP, and operates various functions of higher layers of the base station device 820. For example, the controller 821 generates data packets from data in signals processed by the radio communication interface 825, and transfers the generated packets via the network interface 823. The controller 821 can bundle data from multiple baseband processors to generate bundled packets and transfer the generated bundled packets. The controller 821 may have logic functions performing control such as radio resource control, radio bearer control, mobility management, admission control, and scheduling. The control may be performed in combination with gNBs, eNBs, or core network nodes (e.g., Access and Mobility Management Function, AMF) in the vicinity. The memory 822 includes a RAM and a ROM, and stores programs executed by the controller 821 and various types of control data (such as a terminal list, transmission power data, and scheduling data).

Network interface 823 is a communication interface for connecting the base station device 820 to the core network 824. The controller 821 may communicate with a core network node or another gNB/eNB via the network interface 823. In this case, the gNB 800 and the core network node or other gNBs/eNBs may be connected to each other through a logical interface (such as an N2 interface with an AMF and an Xn interface with a gNB). The network interface 823 may also be a wired communication interface or a radio communication interface for radio backhaul lines. If the network interface 823 is a radio communication interface, the network interface 823 may use a higher frequency band for radio communication than a frequency band used by the radio communication interface 825.

The radio communication interface 825 supports any cellular communication scheme (such as LTE, LTE-Advanced, NR (New Radio)), and provides radio connection to a terminal positioned in a cell of the gNB 800 via the antenna 810. The radio communication interface 825 may typically include, for example, a baseband (BB) processor 826 and an RF circuit 827. The BB processor 826 may perform, for example, encoding/decoding, modulation/demodulation, and multiplexing/demultiplexing, and perform various types of signal processing of layers (e.g., L1, Medium Access Control (MAC), Radio Link Control (RLC), and Packet Data Convergence Protocol (PDCP)). Instead of the controller 821, the BB processor 826 may have a part or all of the above-described logic functions. The BB processor 826 may be a memory that stores communication control programs, or a module that includes a processor and associated circuit configured to execute programs. Updating the programs may allow the functions of the BB processor 826 to be changed. The module may be a card or blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

As illustrated in FIG. 17, the radio communication interface 825 may include multiple BB processors 826. For example, the multiple BB processors 826 may be compatible with multiple frequency bands used by the gNB 800. As illustrated in FIG. 17, the radio communication interface 825 may include multiple RF circuits 827. For example, the multiple RF circuits 827 may be compatible with multiple antenna elements. Although FIG. 17 illustrates the example in which the radio communication interface 825 includes the multiple BB processors 826 and the multiple RF circuits 827, the radio communication interface 825 may also include a single BB processor 826 or a single RF circuit 827.

(Second Application Case)

Figure 18:
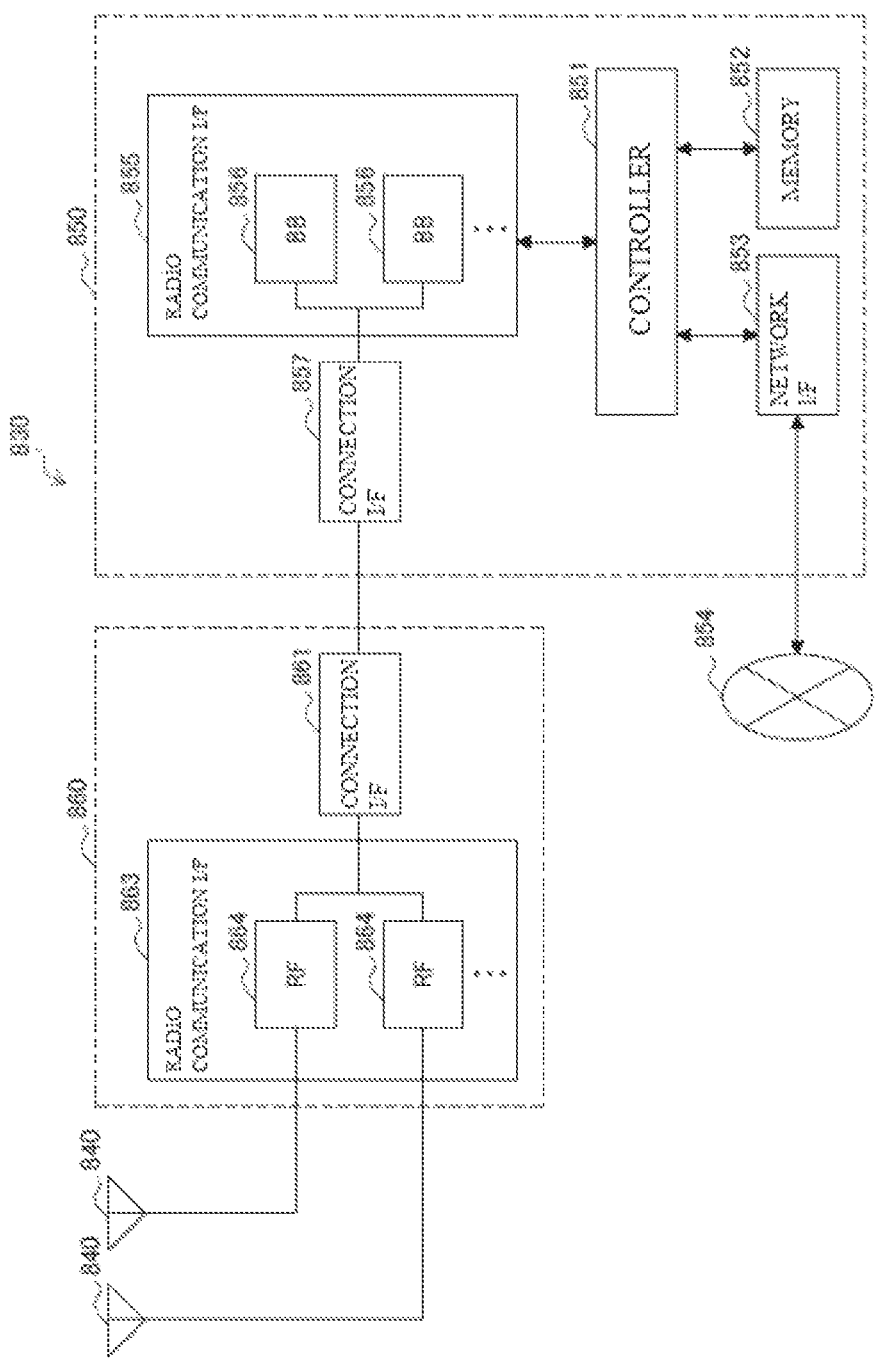
FIG. 18 is a block diagram illustrating a second example of an exemplary configuration of a gNB according to an embodiment of the present disclosure.

FIG. 18 is a block diagram illustrating a second example of a schematic configuration of a gNB to which the technology of the present disclosure may be applied. The gNB 830 includes one or more antennas 840, a base station device 850, and an RRH 860. The RRH 860 and each antenna 840 may be connected to each other via an RF cable. The base station device 850 and the RRH 860 may be connected to each other via a high speed line such as a fiber optic cable.

Each of the antennas 840 includes a single antenna element or multiple antenna elements (such as multiple antenna elements included in a MIMO antenna) and is used by the RRH 860 for transmitting and receiving radio signals. As illustrated in FIG. 18, the gNB 830 may include multiple antennas 840. For example, the multiple antennas 840 may be compatible with multiple frequency bands used by the gNB 830. The base station device 850 includes a controller 851, a memory 852, a network interface 853, a radio communication interface 855, and a connection interface 857. The controller 851, the memory 852, and the network interface 853 are the same as the controller 821, the memory 822, and the network interface 823 described with reference to FIG. 17.

The radio communication interface 855 supports any cellular communication scheme (such as LTE and LTE-Advanced) and provides radio communication to terminals positioned in a sector corresponding to the RRH 860 via the RRH 860 and the antenna 840. The radio communication interface 855 may typically include, for example, a BB processor 856. The BB processor 856 is the same as the BB processor 826 described with reference to FIG. 17, except that the BB processor 856 is connected to the RF circuit 864 of the RRH 860 via a connection interface 857. As illustrated in FIG. 18, the radio communication interface 855 may include multiple BB processors 856. For example, the multiple BB processors 856 may be compatible with multiple frequency bands used by the gNB 830. Although FIG. 18 illustrates the example in which the radio communication interface 855 includes multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication in the above-described high speed line that connects the base station device 850 (radio communication interface 855) to the RRH 860.

The RRH 860 includes a connection interface 861 and a radio communication interface 863.

The connection interface 861 is an interface for connecting the RRH 860 (radio communication interface 863) to the base station device 850. The connection interface 861 may also be a communication module for communication in the above-described high speed line.

The radio communication interface 863 transmits and receives radio signals via the antenna 840. The radio communication interface 863 may typically include, for example, an RF circuit 864. The RF circuit 864 may include, for example, a mixer, a filter, and an amplifier, and transmits and receives radio signals via the antenna 840. As illustrated in FIG. 18, the radio communication interface 863 may include multiple RF circuits 864. For example, the multiple RF circuits 864 may support multiple antenna elements. Although FIG. 18 illustrates the example in which the radio communication interface 863 includes the multiple RF circuits 864, the radio communication interface 863 may also include a single RF circuit 864.

In the gNB 800 and the gNB 830 illustrated in FIGS. 17 and 18, one or more components included in the processing circuit 4010 described with reference to FIG. 4 may be implemented in the radio communication interface 912. Alternatively, at least a portion of these components may also be implemented by the controller 821 and the controller 851.

[Application Cases of the Terminal Device]

(First Application Case)

Figure 19:
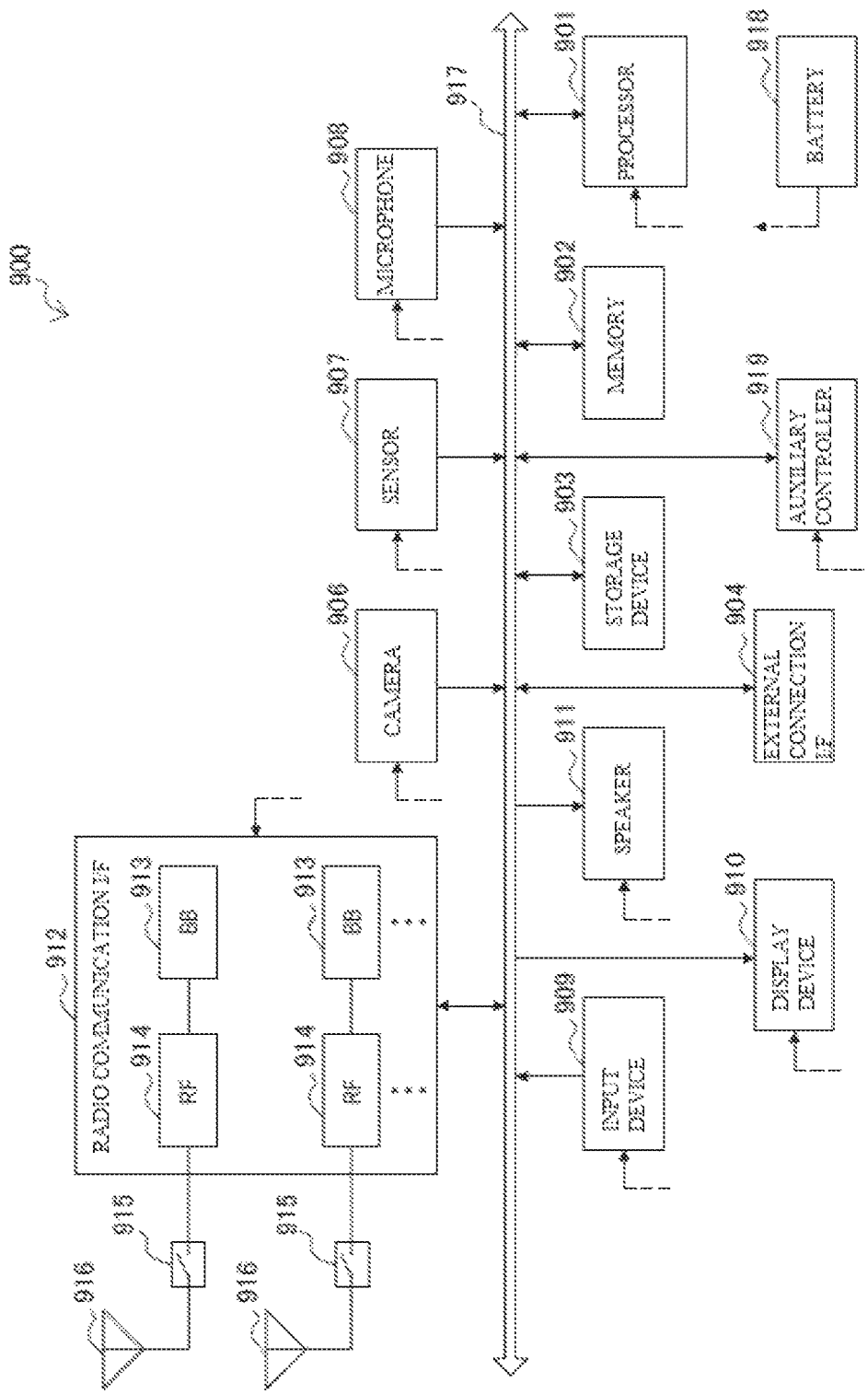
FIG. 19 is a block diagram illustrating an example of an exemplary configuration of a smartphone according to an embodiment of the present disclosure.

FIG. 19 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores programs that are executed by the processor 901 and data. The storage 903 may include a storage medium, such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates captured images. The sensor 907 may include a set of sensors, such as a measurement sensor, a gyro sensor, a geomagnetic sensor, and an acceleration sensor. The microphone 908 converts sound that is input to the smartphone 900 to audio signals. The input device 909 includes, for example, a touch sensor, a keypad, a keyboard, a button, or a switch configured to detect touches on the screen of the display device 910, and receives operations or information input from a user. The display device 910 includes a screen such as a liquid crystal display (LCD) and an organic light emitting diode (OLED) display, and displays output images of the smartphone 900. The speaker 911 converts audio signals that are output from the smartphone 900 to sound.

The radio communication interface 912 supports any cellular communication scheme (such as LTE and LTE-Advanced) and performs radio communication. The radio communication interface 912 may typically include, for example, a BB processor 913 and an RF circuit 914. The BB processor 913 may perform, for example, encoding/decoding, modulation/demodulation, and multiplexing/demultiplexing, and perform various types of signal processing for radio communication. Meanwhile, the RF circuit 914 may include, for example, a mixer, a filter, and an amplifier, and transmits and receives radio signals via the antenna 916. The radio communication interface 912 may be one chip module that integrates the BB processor 913 and the RF circuit 914 thereon. As illustrated in FIG. 19, the radio communication interface 912 may include multiple BB processors 913 and multiple RF circuits 914. Although FIG. 19 illustrates an example in which the radio communication interface 912 includes multiple BB processors 913 and multiple RF circuits 914, the radio communication interface 912 may also include a single BB processor 913 or a single RF circuit 914.

Furthermore, in addition to cellular communication schemes, the radio communication interface 912 may support additional types of radio communication schemes, such as a short-range wireless communication scheme, a near field communication scheme, and a wireless local area network (LAN) scheme. In such cases, the radio communication interface 912 may include a BB processor 913 and an RF circuit 914 for each radio communication scheme.

Each of the antenna switches 915 switches the connection destination of the antenna 916 among multiple circuits (such as circuits for different radio communication schemes) included in the radio communication interface 912.

Each of the antennas 916 includes a single antenna element or multiple antenna elements (such as multiple antenna elements included in a MIMO antenna) and is used by the radio communication interface 912 to transmit and receive radio signals. As illustrated in FIG. 19, the smartphone 900 may include multiple antennas 916. Although FIG. 19 illustrates an example in which the smartphone 900 includes multiple antennas 916, the smartphone 900 may also include a single antenna 916.

Additionally, the smartphone 900 may include an antenna 916 for each radio communication scheme. In this case, the antenna switch 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the radio communication interface 912, and the auxiliary controller 919 to each other. The battery 918 supplies power to various blocks of the smartphone 900 illustrated in FIG. 19 via feeder lines, which are partially shown as dashed lines in the figure. The auxiliary controller 919 operates the minimum necessary functions of the smartphone 900, for example, in a sleep mode.

In the smartphone 900 illustrated in FIG. 19, one or more components included in the processing circuit 4010 described with reference to FIG. 4 may be implemented in the radio communication interface 912. Alternatively, at least a portion of these components may also be implemented by the processor 901 or the auxiliary controller 919.

(Second Application Case)

Figure 20:
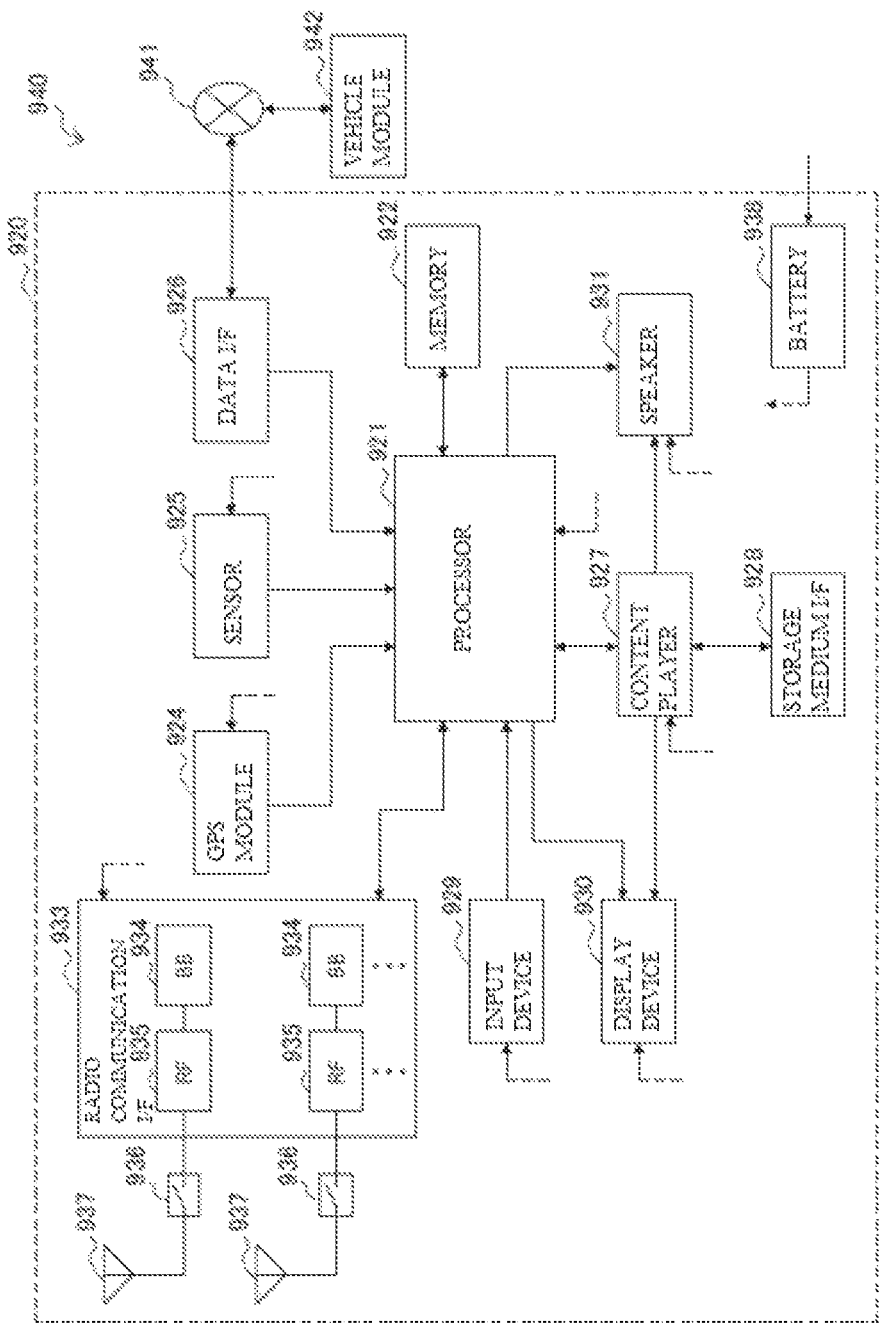
FIG. 20 is a block diagram illustrating an example of an exemplary configuration of an automobile navigation device according to an embodiment of the present disclosure.

FIG. 20 is a block diagram illustrating an example of a schematic configuration of a car navigation device 920 to which the technology of the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a speaker 931, and a radio communication interface 933, one or more antenna switches 936, one or more antennas 937, and a battery 938.

The processor 921 may be, for example, a CPU or a SoC, and controls a navigation function and other functions of the car navigation device 920. The memory 922 includes RAM and ROM, and stores programs that are executed by the processor 921 and data.

The GPS module 924 uses GPS signals received from GPS satellites to measure a position (such as latitude, longitude, and altitude) of the car navigation device 920. The sensor 925 may include a set of sensors, such as a gyro sensor, a geomagnetic sensor, and an air pressure sensor. The data interface 926 is connected to, for example, an in-vehicle network 941 via a terminal not shown, and acquires data (such as vehicle speed data) generated by the vehicle.

The content player 927 reproduces content stored in a storage medium (such as a CD and a DVD) that is inserted into the storage medium interface 928. The input device 929 includes, for example, a touch sensor configured to detect touches on a screen of the display device 930, a button, or a switch, and receives operations or information input from a user. The display device 930 includes a screen such as an LCD or OLED display, and displays images of the navigation function or content that is reproduced. The speaker 931 outputs sound of the navigation function or content that is reproduced.

The radio communication interface 933 supports any cellular communication scheme (such as LTE and LTE-Advanced) and performs radio communication. The radio communication interface 933 may typically include, for example, a BB processor 934 and an RF circuit 935. The BB processor 934 may perform, for example, encoding/decoding, modulation/demodulation, and multiplexing/demultiplexing, and perform various types of signal processing for radio communication. Meanwhile, the RF circuit 935 may include, for example, a mixer, a filter, and an amplifier, and transmits and receives radio signals via the antenna 937. The radio communication interface 933 may also be one chip module that integrates the BB processor 934 and the RF circuit 935 thereon. As illustrated in FIG. 20, the radio communication interface 933 may include multiple BB processors 934 and multiple RF circuits 935. Although FIG. 20 illustrates an example in which the radio communication interface 933 includes multiple BB processors 934 and multiple RF circuits 935, the radio communication interface 933 may also include a single BB processor 934 or a single RF circuit 935.

Furthermore, in addition to a cellular communication scheme, the radio communication interface 933 may support other types of radio communication schemes, such as a short-range wireless communication scheme, a near-field communication scheme, and a wireless LAN scheme. In such cases, the radio communication interface 933 may include a BB processor 934 and an RF circuit 935 for each radio communication scheme.

Each of the antenna switches 936 switches the connection destination of the antenna 937 among multiple circuits (such as circuits for different radio communication schemes) included in the radio communication interface 933.

Each of the antennas 937 includes a single antenna element or multiple antenna elements (such as multiple antenna elements included in a MIMO antenna) and is used by the radio communication interface 933 to transmit and receive radio signals. As illustrated in FIG. 20, the car navigation device 920 may include multiple antennas 937. Although FIG. 20 illustrates an example in which the car navigation device 920 includes multiple antennas 937, the car navigation device 920 may also include a single antenna 937.

Furthermore, the car navigation device 920 may include an antenna 937 for each radio communication scheme. In this case, the antenna switch 936 may be omitted from the configuration of the car navigation device 920.

The battery 938 supplies power to various blocks of the car navigation device 920 illustrated in FIG. 20 via feeder lines that are partially shown as dashed lines in the figure. The battery 938 accumulates power supplied from the vehicle.

In the car navigation device 920 illustrated in FIG. 20, one or more components included in the processing circuit 4010 described with reference to FIG. 4 may be implemented in the radio communication interface 912. Alternatively, at least some of these components may also be implemented by the processor 921.

The technology of the present disclosure may also be realized as an in-vehicle system (or vehicle) 940 including one or more blocks of the car navigation device 920, the in-vehicle network 941, and the vehicle module 942. The vehicle module 942 generates vehicle data such as vehicle speed, motor speed, and failure information, and outputs the generated data to the in-vehicle network 941.

It is to be understood that the phrase "an embodiment" or a similar expression in this specification refers to a particular feature, structure, or characteristic described in connection with the embodiment is included in at least one specific embodiment of the present disclosure. Therefore, in the specification, the occurrence of the terms "in an embodiment of the present disclosure" and the like do not necessarily refer to the same embodiment.

Those skilled in the art will appreciate that the present disclosure is embodied as a system, an apparatus, a method, or a computer readable medium (e.g., a non-transitory storage medium) as a computer program product. Accordingly, the present disclosure may be embodied in various forms, such as a completely hardware embodiment, a completely software embodiment (including firmware, resident software, microprogram code, etc.), or as an implementation of software and hardware, which will be referred to below as "circuit", "module" or "system". Furthermore, the present disclosure may also be embodied in the form of any tangible media as a computer program product having computer usable program code stored thereon.

The related description of the present disclosure is described with reference to flowchart illustrations and/or block diagrams of systems, apparatuses, methods, and computer program products according to specific embodiments of the present disclosure. It will be understood that each block of the flowchart illustrations and/or block diagrams, and any combination of blocks in the flowcharts and/or block diagrams may be embodied using computer program instructions. These computer program instructions may be executed by a machine composed of a processor of a general purpose computer or a special computer or other programmable data processing apparatus, and the instructions are processed by a computer or other programmable data processing apparatuses for implementing the functions or operations described in the flowcharts and/or block diagrams.

The flowcharts, block diagrams of the architecture, functions, and operations that may be embodied by the systems, apparatus, methods, and computer program products according to various embodiments of the present disclosure are shown in the drawings. Thus, each block in a flowchart or a block diagram may represent a module, a segment, or a portion of program code that comprises one or more executable instructions to implement specified logical functions. Additionally, it should be noted that in some other embodiments, the functions described in the blocks may not be performed in the order as illustrated. By way of example, two blocks illustrated as connected may in fact be executed simultaneously, or in some cases, may also be executed in the reverse order as illustrated, depending on the functions involved. In addition, it should be noted that blocks of each block diagram and/or flowchart, and combinations of blocks in the block diagrams and/or flowcharts may be embodied by means of a system based on a dedicated hardware, or may perform specific functions or operations by means of a combination of dedicated hardware and computer instructions.

The embodiments of the present disclosure have been described above, and the foregoing description is illustrative but not exhaustive, and not limited to the disclosed embodiments. Many modifications and variants will be apparent to those of ordinary skilled in the art without departing from the scope and spirit of the described embodiments. The choice of terms used herein is intended to best explain the principles of the embodiments, practical applications, or technical improvements over technologies found in the market, or to enable others of ordinary skill in the art to understand the embodiments disclosed herein.

The invention claimed is:

1. An electronic device used in a first communication device side including:
   processing circuitry configured to:
   determine a simplified scheme for beam sweeping to be performed on a first channel from the first communication device to a second communication device and a second channel from the second communication device to the first communication device based on beam correspondence information of transmitting and receiving beams of the first communication device, the beam correspondence information of transmitting and receiving beams of the first communication device being used for indicating a corresponding relation between a maximum transmitting beam and a maximum receiving beam of the first communication device.

2. The electronic device according to claim 1, the processing circuitry is further configured to:
acquire the beam correspondence information of transmitting and receiving beams of the first communication device.

3. The electronic device according to claim 2, wherein acquiring the beam correspondence information of transmitting and receiving beams of the first communication device by beam sweeping performed in advance on the first channel and the second channel.

4. The electronic device according to claim 3, wherein acquiring the beam correspondence information of transmitting and receiving beams of the first communication device by beam sweeping performed in advance on the first channel and the second channel including:
performing a beam sweeping on the first channel using a plurality of transmitting beams of the first communication device so as to make the second communication device determine the maximum transmitting beam of the first communication device;
acquiring the maximum transmitting beam of the first communication device from the second communication device;
performing a beam sweeping on the second channel using a plurality of receiving beams of the first communication device to determine the maximum receiving beam of the first communication device;
determining the beam correspondence information of transmitting and receiving beams of the first communication device based on the maximum transmitting beam and the maximum receiving beam of the first communication device.

5. The electronic device according to claim 1, wherein in the case that the beam correspondence information of transmitting and receiving beams of the first communication device indicates that the first communication device possesses a beam correspondence of transmitting and receiving beams, the simplified scheme for beam sweeping including:
performing a beam sweeping on the second channel using a plurality of receiving beams of the first communication device to determine the maximum receiving beam of the first communication device, and
determining a transmitting beam of the first communication device corresponding to the maximum receiving beam of the first communication device as the maximum transmitting beam of the first communication device; or
performing a beam sweeping on the first channel using a plurality of transmitting beams of the first communication device to make the second communication device determine the maximum transmitting beam of the first communication device, and
acquiring the determined maximum transmuting beam of the first communication device from the second communication device, and determining a receiving beam of the first communication device corresponding to the maximum transmitting beam of the first communication device as the maximum receiving beam of the first communication device.

6. The electronic device according to claim 1, wherein in the case that the beam correspondence information of transmitting and receiving beams of the first communication device indicates that the first communication device possesses a partial beam correspondence of transmitting and receiving beams, the simplified scheme for beam sweeping including:
performing a beam sweeping on the second channel using a plurality of receiving beams of the first communication device to determine the maximum receiving beam of the first communication device,
performing a beam sweeping on the first channel using a plurality of transmitting beams within a first predetermined coverage including the maximum receiving beam of the first communication device to make the second communication device determine the maximum transmitting beam of the first communication device, and
acquiring the determined maximum transmitting beam of the first communication device from the second communication device; or
performing a beam sweeping on the first channel using a plurality of transmitting beams of the first communication device to make the second communication device determine the maximum transmitting beam of the first communication device,
acquiring the maximum transmitting beam of the first communication device from the second communication device, and
performing a beam sweeping on the second channel using a plurality of receiving beams within a first predetermined coverage including the maximum transmitting beam of the first communication device to determine the maximum receiving beam of the first communication device.

7. The electronic device according to claim 6, wherein the first communication device possesses the partial beam correspondence of transmitting and receiving beams in the case that the maximum transmitting beam and the maximum receiving beam of the first communication device are partially overlapped.

8. The electronic device according to claim 6, wherein the first predetermined coverage is acquired by pre-configuring the first communication device.

9. The electronic device according to claim 5, wherein in the case that the beam correspondence information of transmitting and receiving beams of the second communication device indicates that the second communication device possesses a beam correspondence of transmitting and receiving beams; the simplified scheme for beam sweeping further including:
notifying the second communication device of a maximum transmitting beam of the second communication device determined according to the beam sweeping on the second channel,
wherein the beam sweeping on the first channel is not performed in the simplified scheme for beam sweeping; or
wherein the beam sweeping on the second channel is not performed in the simplified scheme for beam sweeping.

10. The electronic device according to claim 5, wherein in the case that the beam correspondence information of transmitting and receiving beams of the second communication device indicates that the second communication device does not possess a beam correspondence of transmitting and receiving beams, the simplified scheme for beam sweeping further including:
performing the beam sweeping on the first channel using the maximum transmitting beam of the first communication device; or
performing the beam sweeping on the second channel using the maximum receiving beam of the first communication device.

11. The electronic device according to claim 6, wherein in the case that the beam correspondence information of transmitting and receiving beams of the second communication device indicates that the second communication device possesses a partial beam correspondence of transmitting and receiving beams, the simplified scheme for beam sweeping further including:
- notifying the second communication device of a maximum transmitting beam of the second communication device determined according to the beam sweeping on the second channel,
- wherein in the simplified scheme for beam sweeping, the beam sweeping on the first channel is performed using a plurality of transmitting beams of the first communication device within the first predetermined coverage and a plurality of receiving beams of the second communication device within a second predetermined coverage including the maximum transmitting beam of the second communication device.

12. The electronic device according to claim 6, wherein in the case that the beam correspondence information of transmitting and receiving beams of the second communication device indicates that the second communication device possesses a partial beam correspondence of transmitting and receiving beams, in the simplified scheme for beam sweeping, the beam sweeping on the second channel is performed using a plurality of receiving beams of the first communication device within the first predetermined coverage and a plurality of transmitting beams of the second communication device within a second predetermined coverage including the maximum receiving beam of the second communication device, wherein the maximum receiving beam of the second communication device is determined according to the beam sweeping on the first channel.

13. The electronic device according to claim 11,
- wherein the second communication device possesses the partial beam correspondence of transmitting and receiving beams in the case that the maximum transmitting beam and the maximum receiving beam of the second communication device are partially overlapped.

14. The electronic device according to claim 11, wherein the second predetermined coverage is acquired by pre-configuring the second communication device.

15. The electronic device according to claim 1, the processing circuitry is further configured to:
- acquire the beam correspondence information of transmitting and receiving beams of the second communication device from the second communication device and,
- wherein the beam correspondence information of transmitting and receiving beams of the second communication device is used for indicating a corresponding relation between a maximum transmitting beam and a maximum receiving beam of the second communication device.

16. The electronic device according to claim 1, wherein the electronic device includes a plurality of sub-arrays, the simplified scheme of beam sweeping is determined based on a plurality of beam correspondence information of transmitting and receiving beams of the first communication device respectively corresponding to the plurality of sub-arrays.

17. The electronic device according to claim 1, wherein periodically performing the determination of the simplified scheme of beam sweeping, or performing the determination of the simplified scheme of beam sweeping when the beam correspondence information of transmitting and receiving beams of the first communication device is changed.

18. A communication method including:
- determining a simplified scheme for beam sweeping to be performed on a first channel from the first communication device to a second communication device and a second channel from the second communication device to the first communication device based on beam correspondence information of transmitting and receiving beams of the first communication device, the beam correspondence information of transmitting and receiving beams of the first communication device being used for indicating a corresponding relation between a maximum transmitting beam and a maximum receiving beam of the first communication device.

19. A non-transient storage medium stored thereon instructions making a processor to perform the communication method the method including:
- determining a simplified scheme for beam sweeping to be performed on a first channel from the first communication device to a second communication device and a second channel from the second communication device to the first communication device based on beam correspondence information of transmitting and receiving beams of the first communication device the beam correspondence information of transmitting and receiving beams of the first communication device being used for indicating a corresponding relation between a maximum transmitting beam and a maximum receiving beam of the first communication device.

* * * * *